United States Patent
Ramirez et al.

(10) Patent No.: US 11,078,395 B2
(45) Date of Patent: Aug. 3, 2021

(54) WELLBORE DRILLING COMPOSITIONS

(71) Applicant: Chevron Phillips Chemical Company LP, The Woodlands, TX (US)

(72) Inventors: Mario A. Ramirez, Bartlesville, OK (US); Marshall D. Bishop, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 16/712,322

(22) Filed: Dec. 12, 2019

(65) Prior Publication Data

US 2020/0190385 A1    Jun. 18, 2020

Related U.S. Application Data

(60) Provisional application No. 62/778,363, filed on Dec. 12, 2018.

(51) Int. Cl.
*C09K 8/12* (2006.01)
*C09K 8/34* (2006.01)

(52) U.S. Cl.
CPC ..... *C09K 8/12* (2013.01); *C09K 8/34* (2013.01)

(58) Field of Classification Search
CPC ............ C09K 8/12; C09K 8/34; E21B 21/062
See application file for complete search history.

(56) References Cited

U.S. PATENT DOCUMENTS

| | | |
|---|---|---|
| 3,264,214 A | 8/1966 | Stratton |
| 5,627,225 A | 5/1997 | Gorbaty et al. |
| 5,672,642 A | 9/1997 | Gros |
| 5,834,533 A * | 11/1998 | Patel ............... C10M 129/70 523/130 |
| 6,547,710 B1 | 4/2003 | Patel et al. |

(Continued)

FOREIGN PATENT DOCUMENTS

| | | |
|---|---|---|
| CN | 1305965 | 3/2007 |
| CN | 101747873 | 12/2008 |

(Continued)

OTHER PUBLICATIONS

Data Document for Krayton's D1116 copolymer, Kraton Corporation, 2019.*

(Continued)

*Primary Examiner* — Frances Tischler
(74) *Attorney, Agent, or Firm* — Eversheds Sutherland (US) LLP

(57) ABSTRACT

Drilling mud compositions including a first concentration of powdered latex and a second concentration of SAS are described. The second concentration of SAS can be greater than or equal to the first concentration of latex. In some examples, the second concentration of SAS can be greater than the first concentration of latex. The drilling mud compositions may include an oil-based carrier, or a water-based carrier. An example technique includes dispersing a first predetermined amount of powdered latex and a second predetermined amount of SAS in a water-based carrier to form a water-based mud. Another example technique includes dispersing a first predetermined amount of powdered latex and a second predetermined amount of SAS in an oil-based carrier to form an oil-based mud.

13 Claims, 20 Drawing Sheets

(56) References Cited

U.S. PATENT DOCUMENTS

| | | |
|---|---|---|
| 7,261,156 B2 | 8/2007 | Nguyen et al. |
| 7,264,051 B2 | 9/2007 | Nguyen et al. |
| 7,393,813 B2 | 7/2008 | Halliday et al. |
| 8,020,618 B2 | 9/2011 | Veronique et al. |
| 9,611,416 B2 | 4/2017 | Wang et al. |
| 10,221,636 B2 | 3/2019 | Clapper et al. |
| 2007/0265172 A1 | 11/2007 | Patel et al. |
| 2018/0251666 A1 | 9/2018 | Clapper et al. |

FOREIGN PATENT DOCUMENTS

| | | |
|---|---|---|
| CN | 103937470 | 4/2014 |
| CN | 104962247 | 5/2015 |
| CN | 104927805 | 6/2015 |
| CN | 104962252 | 7/2015 |
| CN | 107556990 | 9/2017 |
| CN | 107652952 | 9/2017 |

OTHER PUBLICATIONS

International Search Report and Written Opinion for PCT/2019/06617 dated Mar. 2, 2020. pp. 1-8.

Ramirez, Mario A. and Ryan Pritchard, "A Novel Approach in the Oil and Gas Industry to use Tribology Science for the Engineering Design and Evaluation of a Solid Lubricant to Improve Lubricity in Extended Reach Horizontal Wells", Presented on Jul. 31, 2020 at Society of Petroleum Engineers (SPE) Virtual Latin American and Caribbean Petroleum Engineering Conference (LACPE) 2020, Jul. 21-30, 2020, available online at https://virtual-spe-lacp-hses.kenes.com/#lct=entrance.

\* cited by examiner

WELLBORE DRILLING COMPOSITIONS

CROSS REFERENCE TO RELATED APPLICATIONS

This application claims priority to and the benefit U.S. Provisional Patent Application No. 62/778,363, filed Dec. 12, 2018, which is incorporated herein by reference in its entirety.

TECHNICAL FIELD

This disclosure relates to drilling compositions, for example, compositions used for drilling natural resource wells.

BACKGROUND

Wells may be drilled to extract natural resources such as oil, gas, or water. A wellbore is surrounded by a formation, for example, shale or clay, which may influence the stability of the wellbore. For example, the formation may exert pressure on the wellbore, or fluids from the formation may enter the wellbore. A formation may include permeable regions, and fluids introduced into the wellbore may enter the permeable regions, resulting in fluid loss. Such fluid loss may affect drilling efficiency, may entail replacement of drilling fluids, and affect the stability of the formation.

Drilling compositions, for example, drilling fluids or drilling muds, may be used to facilitate the drilling of wellbores. Drilling fluid or mud may be distributed and circulated along a wellbore to provide functions such as cooling and lubrication of drilling equipment, or to remove cuttings and clear the borehole. In addition to performing these functions, drilling compositions may also assist in promoting formation stability.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, this disclosure describes drilling mud compositions. The drilling mud compositions may be used in wellbore drilling processes, for example, to form oil wells. In an aspect, sodium asphalt sulfonate (SAS), an asphalt salt, may be used to control fluid loss and lubricity of drilling mud compositions. In addition, SAS may seal shale microfractures, which may provide formation stability. It has been discovered that powdered latex exhibits synergistic effects when combined with SAS, for example more than additive effects, and this combination promotes control of fluid loss and lubricity and formation stability. For example, adding both powdered latex and SAS to drilling mud compositions provides relatively higher lubricity, lower fluid loss, and better sealing of shale micro-fractures and formation stability, than using similar concentrations of SAS or powdered latex alone. In some aspects, synergistic effects are promoted by using a concentration of SAS that is greater than or equal to that of latex.

In an aspect, this disclosure describes a drilling mud composition including a first concentration of powdered latex and a second concentration of SAS. The second concentration of SAS (by mass, e.g., lbm/bbl) can be greater than or equal to the first concentration of latex (by mass, e.g., lbm/bbl). In some examples, the second concentration of SAS (by mass) can be greater than the first concentration of latex (by mass).

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

DETAILED DESCRIPTION OF THE DISCLOSURE

Figure 1:
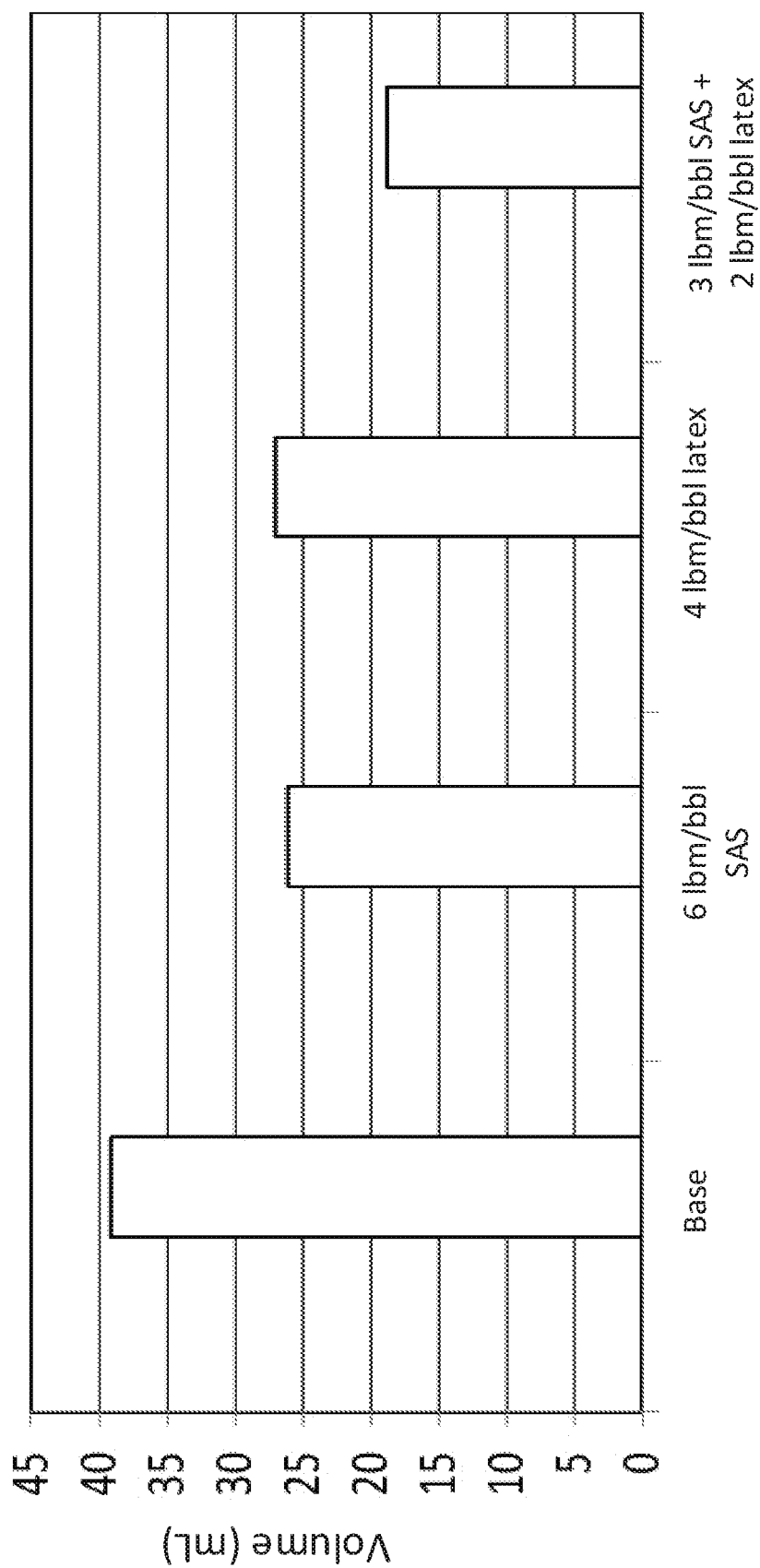
FIG. 1 is a chart illustrating lowered high temperature high pressure (HTHP) fluid loss at 250° F. for a water-based drilling mud composition including both sodium asphalt sulfonate (SAS) and powdered latex relative to compositions that do not include one or both of SAS or latex.

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a population-averaged particle size of from about 70 micrometers to about 100 micrometers, Applicant's intent is to recite individually 70, 71, 72, 73, 74, 75, 76, 77, 78, 79, 80, . . . , 98, 99, 100, including any individual whole number between and including 70 and 100, sub-ranges and combinations of sub-ranges encompassed therein, and these methods of describing such ranges are interchangeable. Moreover, all numerical end points of ranges disclosed herein are approximate, unless excluded by proviso. As a representative example, if Applicants disclose in an aspect of the disclosure that one or more drilling mud compositions has a plastic viscosity in a range from 20 cP to 30 cP, this range should be interpreted as encompassing viscosities in a range from "about" 20 cP to "about" 30 cP.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

The term "latex" refers to an emulsion of one or more polymers in a solvent such as water.

The term "powdered latex" refers to a powder formed by drying or dehydrating latex.

The term "asphalt sulfonate" refers to a sulfonated asphalt formed by treating asphalt with a sulfonating agent.

The term "sodium asphalt sulfonate" (SAS) refers to a sodium salt of asphalt sulfonate.

The term "substituted" when used to describe a group, for example, when referring to a substituted analog of a particular group, is intended to describe the compound or group wherein any non-hydrogen moiety formally replaces hydrogen in that group or compound and is intended to be non-limiting. A compound or group can also be referred to herein as "unsubstituted" or by equivalent terms such as "non-substituted," which refers to the original group or compound. "Substituted" is intended to be non-limiting and include inorganic substituents or organic substituents as specified and as understood by one of ordinary skill in the art.

Although any methods and materials similar or equivalent to those described herein can be used in the practice or testing of the invention, the typical methods and materials are herein described.

The Abstract of this application is not intended to be used to construe the scope of the claims or to limit the scope of the subject matter that is disclosed herein, but rather to satisfy the requirements of 37 C.F.R. § 1.72(b), to enable the United States Patent and Trademark Office and the public generally to determine quickly from a cursory inspection the nature and gist of the technical disclosure. Moreover, any headings that are employed herein are also not intended to be used to construe the scope of the claims or to limit the scope of the subject matter that is disclosed herein. Any use of the past tense to describe any example otherwise indicated as constructive or prophetic is not intended to reflect that the constructive or prophetic example has actually been carried out.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to drilling compositions, for example, compositions used for drilling natural resource wells. The drilling compositions include powdered latex, and at least one salt of asphalt sulfonate, for example, sodium asphalt sulfonate (SAS).

Latex is an emulsion of one or more polymers in water or an aqueous medium and may be natural or synthetic. In some examples, latex includes an emulsion of a synthetic copolymer. For example, latex may include an emulsion of a styrene-butadiene copolymer in an aqueous medium. Natural or synthetic latex may include dispersed polymeric particles. The properties of latex may depend, inter alia, on the extent of crosslinking in the polymer.

Powdered latex may be formed from latex, for example, by drying, dewatering, or dehydrating latex to separate or remove water from the emulsion to leave dispersed particles or agglomerates of one or more polymers. Powdered latex may thus include a powder of polymeric particles separated from an aqueous medium of latex, for example, by drying. The drying may include spray drying.

The properties of powdered latex may be controlled by controlling the properties of the latex from which the powdered latex is prepared. For example, the extent of crosslinking, concentration, solvent density, rate of drying, or other parameters may ultimately determine the properties of powdered latex. Powdered latex is dispersible or soluble in water-based and oil-based carriers, and is suitable for use in drilling mud compositions, for example, water-based drilling mud compositions and oil-based drilling mud compositions.

The powdered latex may include at least one of a styrene butadiene copolymer or a vinyl acetate ethylene copolymer. In some aspects, the powdered latex consists of or consists essentially of styrene butadiene copolymer. In some aspects, the powdered latex consists of or consists essentially of vinyl acetate ethylene copolymer. The powdered latex may have any suitable population-averaged particle size and particle size distribution. For example, the powdered latex may have a population-averaged particle size in a range from about 0.150 micrometers to about 150 micrometers. In some aspects, the powdered latex has a population-averaged particle size in a range from about 70 micrometers to about 100 micrometers, or in a range from about in a range from about 80 micrometers to about 90 micrometers. In some aspects, the population-averaged particle size can be about 85 micrometers. The population-averaged particle size may be a D50 size measured by laser diffraction.

The D10, D50, and D90 values represent the 10th percentile, the 50th percentile and the 90th percentile of the particle size distribution (PSD), respectively, as measured by volume. That is, for example, the D10 value on the particle size distribution curve is such that 10% of the particles are less than and 90% are greater than the particle size at the applicable point of measurement Similarly, the D50 and D90 values are those values on the particle size distribution curve such that 50% or 90%, respectively, of the particles are less than the particle size at the appropriate point of measurement. For example, for a particular sample, if D50=90 µm, there are 50% of the particles that are larger than 90 µm, and 50% of the particles that are smaller than 90 µm. The methods which may be used for determining the particle size distribution (PSD) of the powdered latex materials for use in accordance with the present disclosure include any of the standard methods for determining the particle size distributions of particulate materials in a particular size range (e.g., from 0.1 to 200 µm), including but not limited to gravitational liquid sedimentation methods as described in ISO 13317, and sieving/sedimentation methods such as described in ISO 1 1277, as well as by spectral, acoustic, and laser diffraction methods, as appropriate, as well as combinations thereof.

Asphalt refers to hydrocarbon materials including bitumen components, for example, one or more of naphthene aromatics, polar aromatics, saturated hydrocarbons, or asphaltenes. Asphalt may be obtained from natural sources or may be obtained by refining petroleum by one or more of distillation, precipitation, cracking, oxidation or other operations. Asphalt may include one or more of asphaltenes, maltenes, blown asphalt, straight residual oils, distillation residues, still bottoms, cracking residues, asphaltic bitumens, or combinations thereof.

Various high molecular weight species of asphalt are commonly separated into 4 fractions; saturates, aromatics, resins, and asphaltenes. The asphaltene fraction is determined by a gravimetric method and is defined to be the hexane insoluble fraction of asphalt. The other fractions are separated by column chromatography using a silica column packing and increasing the polarity of the solvent to elute the respective fractions. The asphaltene fraction is soluble in high polarity solvents such as toluene. Asphalts vary significantly in composition and physical properties depending on the crude oil source and the refinery process. The asphalt may be oxidized to increase the softening point. It is water insoluble.

Natural asphalts such as Gilsonite® (American Gilsonite Company, Houston, Tex.), known generically as uintahite, asphaltum, or asphaltite, are similar to petroleum asphalt and have similar properties. Gilsonite® is often used in drilling fluids due to its high softening point.

Polymer modified asphalts are petroleum asphalts that have been blended with synthetic polymers such as SBS, EVA, or rubber to improve their performance in certain applications, especially paving.

Asphalt sulfonate (also known as sulfonated asphalt) can be formed by sulfonating an asphalt with a sulfonation agent. Sulfonation agents may include one or more of fuming sulfuric acid, chlorosulfonic acid, concentrated sulfuric acid, or sulfur trioxide. Asphalt sulfonate may be prepared by forming a mixture of asphalt and a solvent and exposing the mixture to sulfonation agent. The solvent may include hexane. After sulfonation, the resulting product may be neutralized to form a salt, followed by separation from the solvent. The neutralization may be performed using a basic compound, for example, sodium hydroxide or potassium hydroxide. Neutralization with sodium hydroxide forms sodium asphalt sulfonate, while neutralization with potassium hydroxide forms potassium asphalt sulfonate. Asphalt sulfonate may have different properties and include a mixture or combination of materials based on the parameters of the sulfonation process, for example, the degree of sulfonation or the type of sulfonating agent utilized.

The term "sodium asphalt sulfonate" (SAS) refers to a sodium salt of asphalt sulfonate. While the disclosure refers to SAS, in examples, SAS may be combined with or replaced by one or more different salts of asphalt sulfonate, for example, a potassium salt, a calcium salt, a lithium salt, or another suitable salt of asphalt sulfonate. Unlike asphalt, which is neither anionic nor water soluble, sodium asphalt sulfonate may be anionic and water soluble, for example, at least 70%, or at least 80% water soluble. For example, sodium asphalt sulfonate may be produced by reacting asphalt (thinned with heptane) with sulfur trioxide to form the sulfonic acid. The acid may be neutralized with caustic (50% NaOH) to form the sodium salt. This product is water soluble and no longer exhibits the softening point or other characteristics of asphalt.

Soltex® (Drilling Specialties Company, The Woodlands, Tex.) is an example of a sodium asphalt sulfonate. It does not exhibit the typical properties of asphalt, does not melt, and does not have a softening point, in contrast with asphalt and other natural bitumen products that do soften and melt.

Drilling compositions including both powdered latex and SAS may exhibit one or more of lower fluid loss relative to compositions that do not include one or both of powdered latex or SAS. The fluid loss may be determined by high-temperature high-pressure (HTHP) fluid loss tests, permeability plugging (PPT) tests, or spurt loss, according to protocols established by the American Petroleum Institute (API). Drilling compositions including both powdered latex and SAS may provide better lubrication, for example, lower coefficient of friction, relative to compositions that do not include one or both of latex or SAS. Drilling compositions according to the disclosure may also promote formation stability and removal of cuttings. The synergistic effects resulting from combining powder latex and SAS apply to drilling mud compositions including oil-based carriers or water-based carriers. Without being bound by theory, a chemical coupling or network formation may result by combining powdered latex and SAS, which may result in synergy.

In aspects, compositions including both powdered latex and SAS, and having a greater concentration by mass of SAS than that of powdered latex may exhibit lower fluid loss, higher lubrication, and higher formation stability relative to compositions including other relative concentrations of SAS and powdered latex.

According to an aspect, a drilling mud composition includes a first concentration of powdered latex, and a second concentration of SAS. In some aspects, the second concentration of SAS can be greater than or equal to the first concentration of latex. In some such aspects, the second concentration of SAS can be greater than the first concentration of latex. For example, the second concentration of SAS can be greater than the first concentration of latex by a predetermined threshold, for example, by at least 0.1 pounds per barrel (lbm/bb1), by at least 0.25 lbm/bbl, by at least 0.5 lbm/bbl, by at least 1.0 lbm/bbl, by at least 1.5 lbm/bbl, by at least 2 lbm/bbl, by at least 2.5 lbm/bbl, by at least 3 lbm/bbl, by at least 3.5 lbm/bbl, by at least 4 lbm/bbl, or by at least 5 lbm/bbl. In other examples, the second concentration of SAS can be substantially the same as the first concentration of latex. In still other examples, the second concentration of SAS can be lower than the first concentration of latex.

According to an aspect, a drilling mud composition includes a first concentration of powdered latex and a second concentration of SAS, where the second concentration of SAS is greater than or equal to the first concentration of latex.

The powdered latex and SAS may be dispersed or solubilized in a carrier, for example, a water-based carrier or an oil-based carrier, to form a drilling mud composition. In some examples, an additive composition to be added to a drilling mud composition or to a carrier composition may include powdered latex and SAS according to the disclosure. The additive composition may also include one or more additives, for example, one or more of asphalt, Gilsonite® (or uintahite), lignite, or any other suitable drilling composition additive.

In some aspects, the drilling mud composition includes a water-based carrier and a second concentration of SAS that is greater than or equal to a first concentration of powdered latex. In some such aspects, the second concentration of SAS in the drilling mud composition can be greater than the first concentration of latex. Drilling mud compositions including a water-based carrier according to such aspects may exhibit lower fluid loss than compositions that do not include one or both of powdered latex or SAS. For example, in some such aspects, the drilling mud composition has an average high temperature high pressure (HTHP) fluid loss at 250° F. and at 500 pounds per square inch (psi) of less than or about 20 mL when tested according to American Petroleum Institute (API) test 13B-1. In some such aspects, the drilling mud composition can have an average HTHP fluid loss at 250° F. and at 500 psi of less than or about 18 mL, or less than or about 15 mL, or less than or about 12 mL.

In some such aspects, the drilling mud composition has an average permeability plugging test (PPT) loss at 250° F. with a 12 micrometer filtration disc of less than or about 18.0 mL when tested according to API test 13B-1. In some such aspects, the drilling mud composition has an average PPT less of less than or about 16 mL, or less than or about 15 mL, or less than or about 12 mL.

Drilling mud compositions including a water-based carrier according to such aspects may exhibit higher lubrication than compositions that do not include one or both of powdered latex or SAS. For example, in some such aspects, the drilling mud composition has a coefficient of friction of less than or about 0.40 at 250 lb-ft torque. In some such aspects, the drilling mud composition can have a coefficient of friction of less than or about 0.35, or less than or about 0.30, or less than or about 0.25.

Drilling mud compositions including a water-based carrier according to the disclosure may exhibit rheological properties (for example, one or more of plastic viscosity, yield point, or gel strength) suitable for drilling. For example, a drilling mud composition according to some such aspects has a plastic viscosity at 120° F. in a range of from about 10 cP to about 30 cP when tested according to American Petroleum Institute (API) test 13B-1. In some such aspects, the drilling mud composition has a plastic viscosity in a range of from about 10 cP to about 15 cP, or from about 10 cP to about 20 cP, or from 15 cP to about 20 cP, or from about 15 cP to about 30 cP, or from about 20 cP to about 30 cP.

In some such aspects, the drilling mud composition has a yield point at 120° F. in a range of from about 10 lb/100 ft$^2$ to about 45 lb/100 ft$^2$ when tested according to American Petroleum Institute (API) test 13B-1. In some such aspects, the drilling mud composition has a yield point at 120° F. in a range of from about 10 lb/100 ft$^2$ to about 20 lb/100 ft$^2$, or from about 20 lb/100 ft$^2$ to about 45 lb/100 ft$^2$, or from about 10 lb/100 ft$^2$ to about 30 lb/100 ft$^2$, or from about 15 lb/100 ft$^2$ to about 20 lb/100 ft$^2$, or from about 15 lb/100 ft$^2$ to about 30 lb/100 ft$^2$, or from about 30 lb/100 ft$^2$ to about 45 lb/100 ft$^2$.

In some such aspects, the drilling mud composition has a 10-second gel strength at 120° F. in a range from about 2.0 lb/100 ft$^2$ to about 6.5 lb/100 ft$^2$ when tested according to American Petroleum Institute (API) test 13B-1. In some such aspects, the drilling mud composition has a 10-second gel strength at 120° F. in a range from about 2.5 lb/100 ft$^2$ to about 6.5 lb/100 ft$^2$, or from about 2.0 to about 3.0 lb/100 ft$^2$, or from about 5.0 to about 6.5 lb/100 ft$^2$, or from about 5.5 to about 6.5 lb/100 ft$^2$.

In some such aspects, the drilling mud composition has a 10-minute gel strength at 120° F. in a range from about 2 lb/100 ft$^2$ to about 12 lb/100 ft$^2$ when tested according to American Petroleum Institute (API) test 13B-1. In some such aspects, the drilling mud composition has a 10-minute gel strength at 120° F. in a range from about 2 lb/100 ft$^2$ to about 5 lb/100 ft$^2$, or from about 2 lb/100 ft$^2$ to about 10 lb/100 ft$^2$, or from about 3 lb/100 ft$^2$ to about 10 lb/100 ft$^2$, or from about 5 lb/100 ft$^2$ to about 10 lb/100 ft$^2$, or from about 5 lb/100 ft$^2$ to about 12 lb/100 ft$^2$.

Drilling mud compositions including a water-based carrier may include any suitable first concentration of powdered latex and second concentration of SAS. In some such aspects, the second concentration of SAS can be greater than or equal to the first concentration of powdered latex. In some such aspects, the first concentration of powdered latex is at least 1 pounds per barrel (lbm/bb1), and the second concentration of SAS is at least 2 lbm/bbl. In some such aspects, the first concentration of powdered latex can be in a range from about 1.5 to about 2.5 lbm/bbl, and the second concentration of SAS can be in a range from about 2.5 to about 3.5 lbm/bbl. In some such aspects, the first concentration of powdered latex can be about 2 lbm/bbl, and the second concentration of SAS can be about 3 lbm/bbl. In some such aspects, the first concentration of powdered latex can be about 1.5 lbm/bbl, and wherein the second concentration of SAS can be about 4.5 lbm/bbl. In some such aspects, the first concentration of powdered latex can be about 1.2 lbm/bbl, and wherein the second concentration of SAS can be about 4.8 lbm/bbl. In some such aspects, the first concentration of powdered latex can be about 1.8 lbm/bbl, and wherein the second concentration of SAS can be about 4.2 lbm/bbl.

Drilling mud compositions including water-based carriers according to the disclosure may be formed using any suitable technique. In aspects, a technique includes dispersing a first predetermined amount of powdered latex and a second predetermined amount of SAS in a water-based carrier to form a water-based mud. The water-based mud may include any drilling composition according to the disclosure including a water-based carrier.

In some aspects, the drilling mud composition includes an oil-based carrier and a second concentration of SAS that is greater than or equal to a first concentration of powdered latex. In some such aspects, the second concentration of SAS in the drilling mud composition can be greater than the first concentration of latex. Drilling mud compositions including an oil-based carrier according to such aspects may exhibit lower fluid loss than compositions that do not include one or both of powdered latex or SAS. For example, in some such aspects, the drilling mud composition including an oil-based carrier has an average permeability plugging test (PPT) fluid loss at 300° F. with a 55 micrometer filtration disc of less than or about 1.06 mL when tested according to American Petroleum Institute (API) test 13B-2. In some such aspects, the drilling mud composition including an oil-based carrier has an average PPT fluid loss at 275° F. of less than or about 3.3 mL, or less than or about 3.0 mL, or less than or about 2.5 mL. In some such aspects, the drilling mud composition including an oil-based carrier has an average PPT fluid loss at 300° F. with a 40 micrometer filtration disc of less than or about 3.3 mL, or less than or about 3.15 mL, or less than or about 3.00 mL.

Drilling mud compositions including an oil-based carrier according to such aspects may exhibit higher lubrication than compositions that do not include one or both of powdered latex or SAS.

Drilling mud compositions including an oil-based carrier according to the disclosure may exhibit rheological properties suitable for drilling. For example, a drilling mud composition according to some such aspects has a plastic viscosity at 120° F. in a range of from about 10 cP to about 30 cP when tested according to API test 13B-2. In some such examples, a drilling mud composition may have a plastic viscosity in a range of from about 10 cP to about 15 cP, or in a range of from about 12 cP to about 20 cP, or in a range of from about 15 cP to about 20 cP, or in a range of from about 15 cP to about 25 cP, or in a range of from about 15 cP to about 30 cP.

In some such aspects, the drilling mud composition has a yield point at 120° F. in a range of from about 5 lb/100 ft$^2$ to about 12 lb/100 ft$^2$ when tested according to API test 13B-2. In some such aspects, the drilling mud composition has a yield point at 120° F. in a range of from about 5 lb/100 ft$^2$ to about 10 lb/100 ft$^2$, or from about 5 lb/100 ft$^2$ to about 8 lb/100 ft$^2$, or from about 8 lb/100 ft$^2$ to about 12 lb/100 ft$^2$, or from about 5 lb/100 ft$^2$ to about 6 lb/100 ft$^2$.

In some such aspects, the drilling mud composition has a 10-second gel strength at 120° F. in a range from about 2 lb/100 ft$^2$ to about 12 lb/100 ft$^2$ when tested according to API test 13B-2. In some such aspects, the drilling mud composition has a 10-second gel strength at 120° F. in a range from about 2 lb/100 ft$^2$ to about 11 lb/100 ft$^2$, or in a range from about 2 lb/100 ft$^2$ to about 10 lb/100 ft$^2$, or in a range from about 5 lb/100 ft$^2$ to about 12 lb/100 ft$^2$, or in a range from about 2 lb/100 ft$^2$ to about 5 lb/100 ft$^2$.

In some such aspects, the drilling mud composition has a 10-minute gel strength at 120° F. in a range from about 2 lb/100 ft$^2$ to about 40 lb/100 ft$^2$ when tested according to API test 13B-2. In some such aspects, the drilling mud composition has a 10-minute gel strength at 120° F. in a range from about 2 lb/100 ft² to about 10 lb/100 ft², or from about 2 lb/100 ft² to about 20 lb/100 ft², or from about 10 lb/100 ft² to about 30 lb/100 ft², or from about 10 lb/100 ft² to about 20 lb/100 ft², or from about 20 lb/100 ft² to about 30 lb/100 ft², or from about 10 lb/100 ft² to about 40 lb/100 ft².

Drilling mud compositions including an oil-based carrier may include any suitable first concentration of powdered latex and second concentration of SAS. In some such aspects, the second concentration of SAS can be greater than or equal to the first concentration of powdered latex. For example, in some such aspects, the first concentration of powdered latex can be at least about 1 pounds per barrel (lbm/bbl), and the second concentration of SAS can be at least about 1 lbm/bbl. In some such aspects, the first concentration of powdered latex can be at least about 2 lbm/bbl, and the second concentration of SAS can be at least about 2 lbm/bbl. In some such aspects, the first concentration of powdered latex can be at least about 1 lbm/bbl, and the second concentration of SAS can be at least about 2 lbm/bbl. In some such aspects, the first concentration of powdered latex can be at least about 1 lbm/bbl, and the second concentration of SAS can be at least about 3 lbm/bbl. In some such aspects, the first concentration of powdered latex can be at least about 1 lbm/bbl, and the second concentration of SAS can be at least about 4 lbm/bbl. In some such aspects, the first concentration of powdered latex can be at least about 1.5 lbm/bbl, and the second concentration of SAS can be at least about 2.5 lbm/bbl. In some such aspects, the first concentration of powdered latex can be at least about 1.2 lbm/bbl, and the second concentration of SAS can be at least about 4.8 lbm/bbl. In some such aspects, the first concentration of powdered latex can be at least about 1.5 lbm/bbl, and the second concentration of SAS can be at least about 4.5 lbm/bbl. In some such aspects, the first concentration of powdered latex can be about 1 lbm/bbl, and the second concentration of SAS can be about 3 lbm/bbl. In some such aspects, the first concentration of powdered latex can be about 1.2 lbm/bbl, and the second concentration of SAS can be about 4.8 lbm/bbl. In some such aspects, the first concentration of powdered latex can be about 1.5 lbm/bbl, and the second concentration of SAS can be about 4.5 lbm/bbl. In some such aspects, the first concentration of powdered latex can be about 1.8 lbm/bbl, and the second concentration of SAS can be about 4.2 lbm/bbl. In some such aspects, the first concentration of powdered latex can be about 2 lbm/bbl, and the second concentration of SAS can be about 3 lbm/bbl. In some such aspects, the first concentration of powdered latex can be in a range from about 1.5 to about 2.5 lbm/bbl, and the second concentration of SAS can be in a range from about 1.5 to about 2.5 lbm/bbl. In some such aspects, the first concentration of powdered latex can be about 2 lbm/bbl, and wherein the second concentration of SAS can be about 2 lbm/bbl.

Drilling mud compositions including oil-based carriers according to the disclosure may be formed using any suitable technique. In aspects, a technique includes dispersing a first predetermined amount of powdered latex and a second predetermined amount of SAS in an oil-based carrier to form an oil-based mud. The oil-based mud may include any drilling composition according to the disclosure including an oil-based carrier.

Drilling mud compositions according to the disclosure may include a drilling mud composition that is ready for use or may refer a drilling mud additive composition to be added to a carrier or drilling mud prior to use. For example, drilling mud additive compositions may include a blend of powdered latex and SAS. For example, such drilling mud additive compositions may include blends of powdered latex and SAS such that adding a predetermined amount of drilling mud additive compositions to a carrier results in a drilling mud composition including concentrations of powdered latex and SAS according to the disclosure.

The blends of powdered latex and SAS (and including further optional components according to the disclosure) may be described as a solid lubricant, a solid-state lubricant, or solid-like lubricant, because such blends may substantially be solid compared to conventional liquid lubricants. Thus, in embodiments, drilling mud additive compositions may include a solid lubricant composition. For example, the drilling mud additive composition or solid lubricant composition may include SAS and powdered latex. In some embodiments, the drilling mud additive composition or solid lubricant composition solid lubricant composition consists essentially of SAS and powdered latex. In some embodiments, the drilling mud additive composition or solid lubricant composition consists of SAS and powdered latex.

Drilling mud additive compositions may include SAS and powdered latex as a 50/50 SAS-latex blend, a 60/40 SAS-latex blend, a 70/30 SAS-latex blend, an 80/20 SAS-latex blend, or a 90/10 SAS-latex blend. The ratio refers to the relative concentrations of SAS and latex, and the blends may optionally include other components or additives.

Drilling compositions according to the disclosure may provide one or more of better fluid loss control, plugging test performance, formation stability, and lubricity, and may reduce logistic and material handling at a wellsite.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

General Considerations

Fluid loss were determined using high temperature high pressure (HTHP) fluid loss test and permeability plugging test (PPT) protocols according to American Petroleum Institute (API) test set 13B-1 for compositions including a water-based carrier and test set 13B-2 for compositions including an oil-based carrier. Unless otherwise specified, the latex blend or SAS-latex refers to a blend of SAS and XP-211 styrene butadiene copolymer latex, also known as Axilat™ PSB 150 (Synthomer, Roebuck, S.C.).

Example 1

The properties of water-based drilling mud compositions including different concentrations of powdered latex and sodium asphalt sulfonate (SAS) were evaluated. A base mud composition included 7.0 pounds per barrel (lbm/bbl) of bentonite, 2 lbm/bbl of polyanionic cellulose, 0.75 lbm/bbl of a biopolymer, 10 lbm/bbl of Rev Dust™ Inert Particulate (Milwhite, Inc., Brownsville, Tex.), 0.5 lbm/bbl of caustic soda, and 2 lbm/bbl of sodium sulfite. The base composition had a density of 8.6 lbm/gal.

Four samples were prepared: A1) base, B1) base with 6 lbm/bbl SAS, C1) base with 4 lbm/bbl powdered latex, and D1) base with 3 lbm/bbl SAS and 2 lbm/bbl powdered latex (1.5:1 or 60/40 SAS-latex blend). The samples were hot rolled for 16 hours at 250° F. The rheological properties of the samples, such as plastic viscosity, yield point, and gel strength were determined using a rotational viscometer, and are presented in TABLE 1.

TABLE 1

| Rheology (120° F.) | A1 (base) | B1 (SAS) | C1 (latex) | D1 (60/40 SAS-latex) |
|---|---|---|---|---|
| Viscosity at 600 rpm (cP) | 41.50 | 37.50 | 44.00 | 38.10 |
| Viscosity at 300 rpm (cP) | 26.50 | 24.10 | 28.10 | 24.60 |
| Viscosity at 200 rpm (cP) | 20.00 | 18.70 | 21.80 | 18.90 |
| Viscosity at 100 rpm (cP) | 12.90 | 12.10 | 14 | 12.50 |
| Viscosity at 6 rpm (cP) | 1.90 | 1.90 | 2.40 | 2.20 |
| Viscosity at 3 rpm (cP) | 1.40 | 1.30 | 1.90 | 1.70 |
| Plastic viscosity (cP) | 15.00 | 13.40 | 15.90 | 13.50 |
| Yield point (lb/100 ft$^2$) | 11.50 | 10.70 | 12.20 | 11.10 |
| Gel strength (lb/100 ft$^2$) (10 second/10 minute) | 2.1/2.7 | 2.0/3.5 | 2.4/3.0 | 2.3/2.5 |
| API filtrate (mL) | 8.10 | 8.22 | 7.43 | 6.93 |
| pH | 8.27 | 7.81 | 8.51 | 7.94 |

The HTHP fluid loss and spurt loss for the four samples was determined using API test set 13B-1. The results are presented in TABLE 2.

TABLE 2

| | HTHP Fluid Loss (mL) @ 250° F. | | | |
|---|---|---|---|---|
| Minutes | A1 (base) | B1 (SAS) | C1 (latex) | D1 (60/40 SAS-latex) |
| 1 | 3.18 | 2.28 | 2.35 | 17.10 |
| 5 | 7.36 | 4.93 | 5.23 | 3.95 |
| 7.5 | 10.74 | 6.10 | 6.47 | 4.79 |
| 10 | 12.64 | 7.15 | 7.54 | 5.48 |
| 15 | 14.74 | 8.91 | 9.36 | 6.87 |
| 20 | 16.65 | 10.42 | 10.87 | 7.88 |
| 25 | 18.27 | 11.80 | 12.24 | 8.65 |
| 30 | 19.56 | 13.08 | 13.51 | 9.42 |
| HTHP loss (mL) | 39.12 | 26.16 | 27.02 | 18.84 |
| Spurt Loss | 0.0 | 0.0 | 0.0 | 0.1 |

The results of the HTHP test are illustrated in FIG. 1. FIG. 1 is a chart illustrating lowered high temperature high pressure (HTHP) fluid loss at 250° F. for a water-based drilling mud composition including both sodium asphalt sulfonate (SAS) and powdered latex relative to compositions that do not include one or both of SAS or latex. Sample D1 exhibited a reduction in HTHP loss of 28% relative to sample B1, and 30% relative to sample C1.

The coefficient of friction (CoF) for the samples A1 to D1 was determined. CoF can be determined using any one of several means, including with a Lubricity Tester (OFI Testing Equipment, Houston, Tex.), a Lubricity Evaluation Monitor (OFI Testing Equipment, Houston, Tex.), or a Tribometer (Nanovea, Irvine, Calif.). Scaled results (100× CoF) are presented in TABLE 3.

TABLE 3

| Torque (in-lb) | A1 (base) | B1 (SAS) | C1 (latex) | D1 (60/40 SAS-latex) |
|---|---|---|---|---|
| | | 100 × CoF | | |
| 100 | 4.1 | 2.5 | 20.2 | 17.1 |
| 150 | 3.1 | 9.5 | 29.3 | 25.1 |

TABLE 3-continued

| Torque (in-lb) | A1 (base) | B1 (SAS) | C1 (latex) | D1 (60/40 SAS-latex) |
|---|---|---|---|---|
| | | 100 × CoF | | |
| 200 | 3.4 | 7.2 | 37.3 | 31.5 |
| 250 | 8.0 | 5.0 | 43.1 | 38.6 |
| 300 | | 5.9 | 43.4 | 45.4 |
| 350 | | | 47.1 | |
| 400 | | | 66.0 | |

Sample D1 (60/40 SAS-latex) exhibited a CoF that was generally lower than samples B1 (SAS) and C1 (latex), for example, at a torque of 250 in-lb.

Example 2

The properties of water-based drilling mud compositions including different concentrations of powdered latex and sodium asphalt sulfonate (SAS) were evaluated. The base mud composition included 7.0 lbm/bbl of bentonite, 2 lbm/bbl of polyanionic cellulose, 0.75 lbm/bbl of a biopolymer, 10 lbm/bbl of Rev Dust™ Inert Particulate (Milwhite, Inc., Brownsville, Tex.), 0.5 lbm/bbl of caustic soda, 2 lbm/bbl of sodium sulfite, and 20 lbm/bbl of barite. The base composition had a density of 9.0 lbm/gal.

Six samples were prepared: A2) base, B2) base with 6 lbm/bbl SAS, C2) base with 6 lbm/bbl powdered latex, D2) base with 1.5 lbm/bbl SAS and 4.5 lbm/bbl powdered latex (25/75 or 1:3 SAS-latex blend), E2) base with 3.0 lbm/bbl of SAS and 3.0 lbm/bbl of powdered latex (50/50 or 1:1 SAS-latex blend), and F2) base with 4.5 lbm/bbl SAS and 1.5 lbm/bbl powdered latex (75/25 or 3:1 SAS-latex blend). The samples were hot rolled for 16 hours at 250° F. The rheological properties of the samples were determined and are presented in TABLE 4.

TABLE 4

| Rheology (120° F.) | A2 (base) | B2 (SAS) | C2 (latex) | D2 (25/75 SAS-latex) | E2 (50/50 SAS-latex) | F2 (75/25 SAS-latex) |
|---|---|---|---|---|---|---|
| Viscosity at 600 rpm (cP) | 74.90 | 65.50 | 81.00 | 68.40 | 81.60 | 75.20 |
| Viscosity at 300 rpm (cP) | 51.20 | 45.50 | 24.10 | 46.70 | 55.10 | 51.10 |
| Viscosity at 200 rpm (cP) | 41.00 | 40.50 | 18.70 | 37.60 | 45.30 | 43.20 |
| Viscosity at 100 rpm (cP) | 27.90 | 24.50 | 12.10 | 26 | 31 | 29.70 |
| Viscosity at 6 rpm (cP) | 6.90 | 6.00 | 1.90 | 7.00 | 8.20 | 7.60 |
| Viscosity at 3 rpm (cP) | 4.80 | 4.20 | 1.30 | 5.80 | 6.60 | 6.00 |
| Plastic viscosity (cP) | 23.70 | 20.50 | 13.40 | 21.70 | 26.50 | 24.10 |
| Yield point (lb/100 ft$^2$) | 27.50 | 15.60 | 10.70 | 25.00 | 28.60 | 27.00 |
| Gel strength (lb/100 ft$^2$) (10 second/10 minute) | 5.1/12.0 | 3.3/9.5 | 2.0/3.5 | 5.9/11.3 | 6.5/12.7 | 5.8/11.7 |

The PPT fluid loss and spurt loss for the six samples was determined at 250° F. and using a 12 micron disc, using API test set 13B-1. The results are presented in TABLE 5.

TABLE 5

| | | | | PPT Fluid Loss @ 250° F. | | |
|---|---|---|---|---|---|---|
| Minutes | A2 (base) | B2 (SAS) | C2 (latex) | D2 (25/75 SAS-latex) | E2 (50/50 SAS-latex) | F2 (75/25 SAS-latex) |
| 1 | 2.97 | 2.97 | 1.59 | 2.88 | 2.02 | 1.75 |
| 5 | 5.07 | 4.72 | 3.79 | 4.89 | 4.01 | 3.45 |
| 7.5 | 5.99 | 5.51 | 4.81 | 5.87 | 4.73 | 4.53 |
| 10 | 6.58 | 6.26 | 5.38 | 6.66 | 5.39 | 5.00 |
| 15 | 8.15 | 7.46 | 6.35 | 7.86 | 6.77 | 5.97 |
| 20 | 9.03 | 8.39 | 7.77 | 9.01 | 7.90 | 6.96 |
| 25 | 10.24 | 9.71 | 8.79 | 9.85 | 8.63 | 7.92 |
| 30 | 11.02 | 10.28 | 9.56 | 10.63 | 9.66 | 8.70 |
| PPT (mL) | 22.04 | 20.56 | 19.12 | 21.26 | 19.32 | 17.40 |
| Spurt Loss (mL) | 2.2 | 0.0 | 0.0 | 0.1 | 0.0 | 0.0 |

Figure 2:
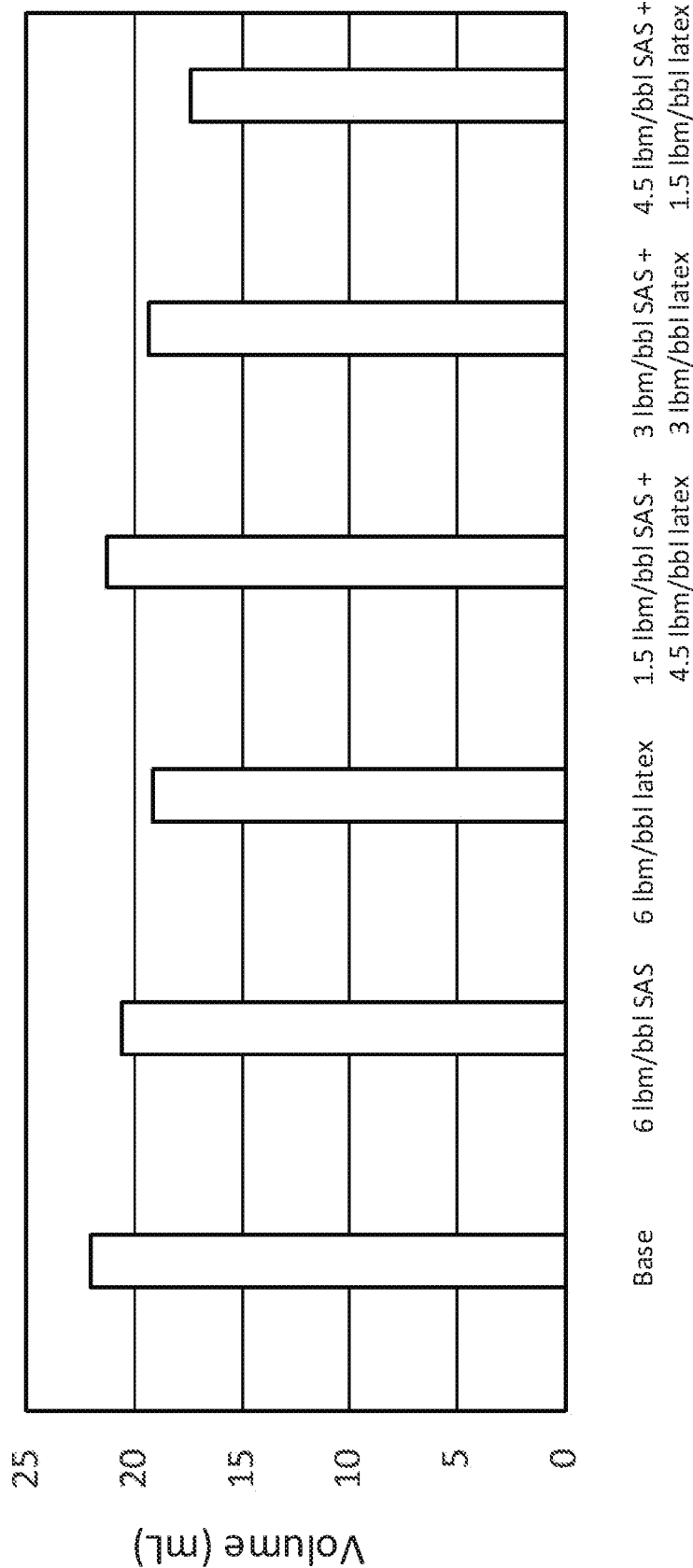
FIG. 2 is a chart illustrating lowered permeability plugging test (PPT) fluid loss at 250° F. for water-based drilling mud compositions including both SAS and powdered latex and having a greater concentration by mass of SAS than that of powdered latex relative to compositions that do not include one or both of SAS or latex.

FIG. 2 is a chart illustrating the lowered permeability plugging test (PPT) fluid loss at 250° F. for water-based drilling mud compositions including both SAS and powdered latex and having a greater concentration of SAS than that of powdered latex relative to compositions that do not include one or both of SAS or latex. Sample F2 (75/25 SAS-latex) exhibited a reduction in PPT loss relative to both samples B2 (SAS) and C2 (latex) and also relative to samples D2 (25/75 SAS-latex) and E2 (50/50 SAS-latex).

Example 3

The properties of water-based drilling mud compositions including different concentrations of powdered latex and sodium asphalt sulfonate (SAS) were evaluated. The base mud composition included 7.0 lbm/bbl of bentonite, 2 lbm/bbl of polyanionic cellulose, 0.75 lbm/bbl of a biopolymer, 10 lbm/bbl of Rev Dust™ Inert Particulate (Milwhite, Inc., Brownsville, Tex.), 0.5 lbm/bbl of caustic soda, 2 lbm/bbl of sodium sulfite, and 20.6 lbm/bbl of barite. The base composition had a density of 9.0 lbm/gal.

Six samples were prepared: A3) base, B3) base with 6 lbm/bbl SAS, C3) base with 6 lbm/bbl powdered latex, D3) base with 1.5 lbm/bbl SAS and 4.5 lbm/bbl powdered latex (25/75 or 1:3 SAS-latex blend), E3) base with 3.0 lbm/bbl of SAS and 3.0 lbm/bbl of powdered latex (50/50 or 1:1 SAS-latesx blend), F3) base with 4.5 lbm/bbl SAS and 1.5 lbm/bbl powdered latex (75/25 or 3:1 SAS-latex blend), G3) base with 3.6 lbm/bbl SAS and 2.4 lbm/bbl powdered latex (60/40 or 1.5:1 SAS-latex blend), H3) base with 4.2 lbm/bbl SAS and 1.8 lbm/bbl powdered latex (70/30 OR 2.33:1 SAS-latex blend). The samples were hot rolled for 16 hours at 250° F. The rheological properties of samples A3 to F3 were determined and are presented in TABLE 6.

TABLE 6

| Rheology @ 120° F. | A3 (base) | B3 (SAS) | C3 (latex) | D3 (25/75 SAS-latex) | E3 (50/50 SAS-latex) | F3 (75/25 SAS-latex) |
|---|---|---|---|---|---|---|
| Viscosity at 600 rpm (cP) | 74.90 | 65.50 | 81.00 | 68.40 | 81.60 | 75.20 |
| Viscosity at 300 rpm (cP) | 51.20 | 45.50 | 24.10 | 46.70 | 55.10 | 51.10 |
| Viscosity at 200 rpm (cP) | 41.00 | 40.50 | 18.70 | 37.60 | 45.30 | 43.20 |
| Viscosity at 100 rpm (cP) | 27.90 | 24.50 | 12.10 | 25.90 | 31.30 | 29.70 |
| Viscosity at 6 rpm (cP) | 6.90 | 6.00 | 1.90 | 7.00 | 8.20 | 7.60 |
| Viscosity at 3 rpm (cP) | 4.80 | 4.20 | 1.30 | 5.80 | 6.60 | 6.00 |
| Plastic viscosity (cP) | 23.70 | 20.50 | 13.40 | 21.70 | 26.50 | 24.10 |
| Yield point (lb/100 ft²) | 27.50 | 15.60 | 10.70 | 25.00 | 28.60 | 27.00 |
| Gel strength (lb/100 ft²) (10 second/ 10 minute) | 5.1/12.0 | 3.3/9.5 | 2.0/3.5 | 5.9/11.3 | 6.5/12.7 | 5.8/11.7 |

The coefficient of friction (CoF) for the samples A3 to H3 was determined. Scaled results (100×CoF) are presented in TABLE 7.

TABLE 7

| Torque | A3 (base) | B3 (SAS) | C3 (latex) | D3 (25/75 SAS-latex) | E3 (50/50 SAS-latex) | F3 (75/25 SAS-latex) | G3 (60/40 SAS-latex) | H3 (70/30 SAS-latex) |
|---|---|---|---|---|---|---|---|---|
| | | | | CoF × 100 | | | | |
| 100 | 17.8 | 17.5 | 14.8 | 16.6 | 16.50 | 15.30 | 16.6 | 14.00 |
| 150 | 25.4 | 24.4 | 23.4 | 23.9 | 23.50 | 22.40 | 24.1 | 22.60 |
| 200 | 31.9 | 31.8 | 30.7 | 31.1 | 31.50 | 29.80 | 31.1 | 30.70 |
| 250 | 41.2 | 40.2 | 39.2 | 37.8 | 39.70 | 37.20 | 38.8 | 38.60 |
| 300 | 52.7 | 48.0 | 47.4 | 45.4 | 47.70 | 44.40 | 47.0 | 45.10 |
| 350 | 67.80 | 60 | 55.7 | 54 | 56 | 51.80 | 55 | 53.70 |
| 400 | | | 63.7 | 62 | | 63.00 | 65 | 62.90 |
| 450 | | | 65.7 | | | | | 71.30 |

Samples F3 (75/25 SAS-latex), G3 (60/40 SAS-latex), and H3 (70/30 SAS-latex) exhibited a CoF that was generally lower than samples B1 (SAS) and C1 (latex), for example, at a torque of 250 in-lb.

Example 4

The properties of water-based drilling mud compositions including different concentrations of powdered latex and sodium asphalt sulfonate (SAS) were evaluated. A base composition was prepared similar to that of EXAMPLE 3. Four samples were prepared: A4) base, B4) base with 6 lbm/bbl SAS, C4) base with 6 lbm/bbl powdered latex, and D4) base with 4.8 lbm/bbl SAS and 1.2 lbm/bbl powdered latex (80/20 or 4:1 SAS-latex blend). The samples were hot rolled for 16 hours at 250° F. The rheological properties of samples A4 to D4 were determined and are presented in TABLE 8.

TABLE 8

| Rheology @ 120° F. | A4 (base) | B4 (SAS) | C4 (latex) | D4 (80/20 SAS-latex) |
|---|---|---|---|---|
| Viscosity at 600 rpm (cP) | 94.30 | 79.00 | 87.90 | 38.10 |
| Viscosity at 300 rpm (cP) | 64.80 | 54.60 | 61.60 | 24.60 |
| Viscosity at 200 rpm (cP) | 51.50 | 43.70 | 52.10 | 18.90 |
| Viscosity at 100 rpm (cP) | 35.60 | 30.50 | 36.70 | 12.50 |
| Viscosity at 6 rpm (cP) | 7.80 | 7.50 | 10.50 | 2.20 |
| Viscosity at 3 rpm (cP) | 6.10 | 5.70 | 8.30 | 1.70 |
| Plastic viscosity (cP) | 29.50 | 24.40 | 26.30 | 13.50 |
| Yield point (lb/100 ft$^2$) | 35.30 | 30.20 | 35.30 | 11.10 |
| Gel strength (lb/100 ft$^2$) (10 second/10 minute) | 6.4/13.8 | 6.1/12.4 | 8.5/17.9 | 2.3/2.5 |

The PPT fluid loss and spurt loss for the four samples was determined at 325° F., using API test set 13B-1. The results are presented in TABLE 9.

TABLE 9

| | PPT Fluid Loss @ 325° F | | | |
|---|---|---|---|---|
| Minutes | A4 (base) | B4 (SAS) | C4 (latex) | D4 (80/20 SAS-latex) |
| 1 | 4.60 | 4.67 | 3.80 | 2.76 |
| 5 | 8.16 | 7.76 | 6.47 | 5.84 |
| 7.5 | 9.40 | 9.15 | 8.11 | 7.03 |
| 10 | 10.70 | 10.49 | 9 | 8.39 |
| 15 | 13.31 | 12.09 | 11.04 | 10.07 |
| 20 | 15.21 | 13.67 | 12.73 | 11.65 |
| 25 | 17.05 | 15.31 | 14.19 | 12.88 |
| 30 | 18.10 | 16.65 | 15.60 | 13.86 |
| PPT (mL) | 36.20 | 33.30 | 31.20 | 27.72 |
| Spurt Loss (mL) | 3.0 | 3.7 | 1.7 | 0.6 |

Figure 3:
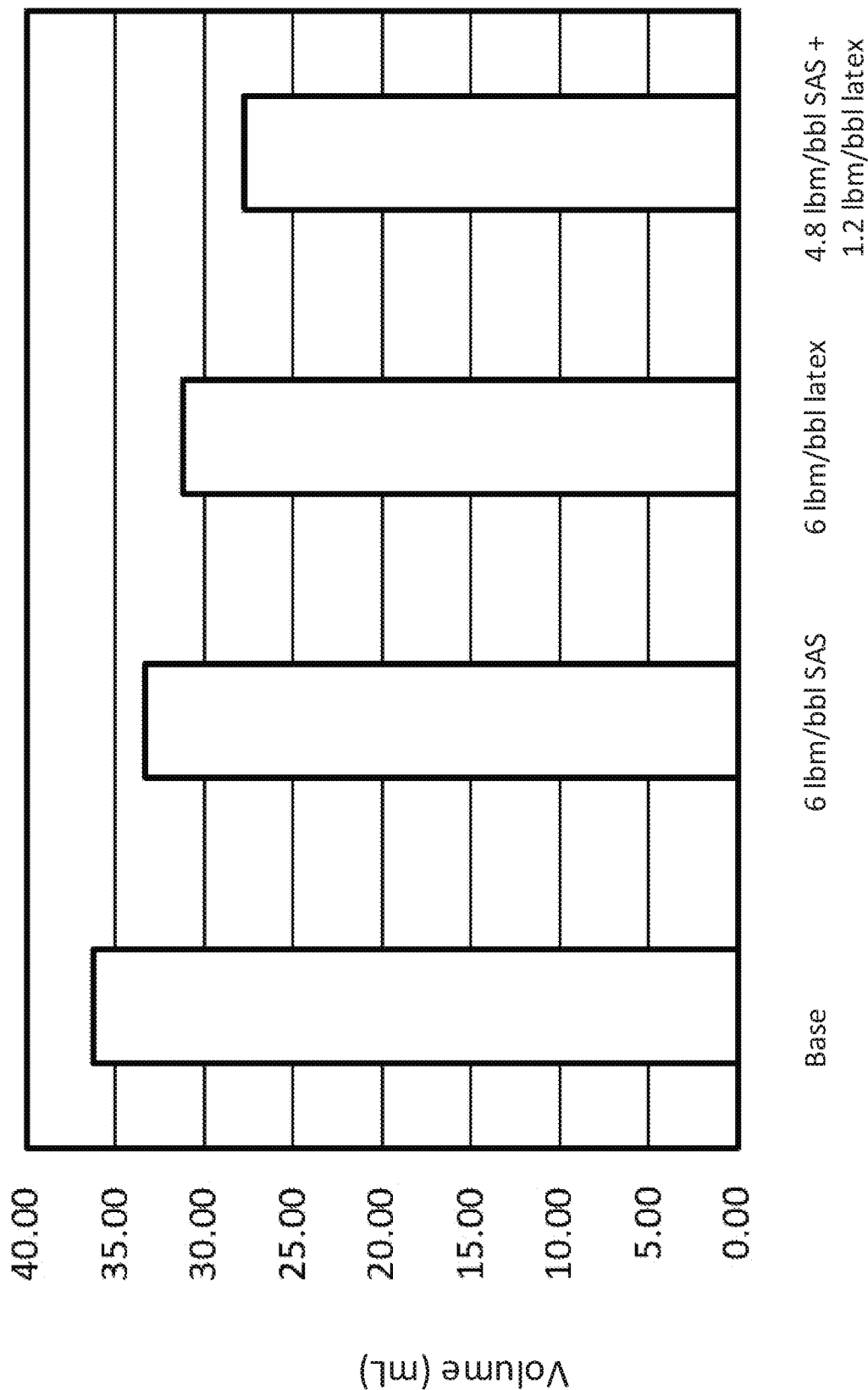
FIG. 3 is a chart illustrating lowered PPT fluid loss at 325° F. for water-based drilling mud compositions including both SAS and powdered latex and having a greater concentration by mass of SAS than that of powdered latex relative to compositions that do not include one or both of SAS or latex.

FIG. 3 is a chart illustrating the lowered PPT fluid loss at 325° F. for water-based drilling mud compositions including both SAS and powdered latex and having a greater concentration of SAS than that of powdered latex relative to compositions that do not include one or both of SAS or latex.

Figure 4:
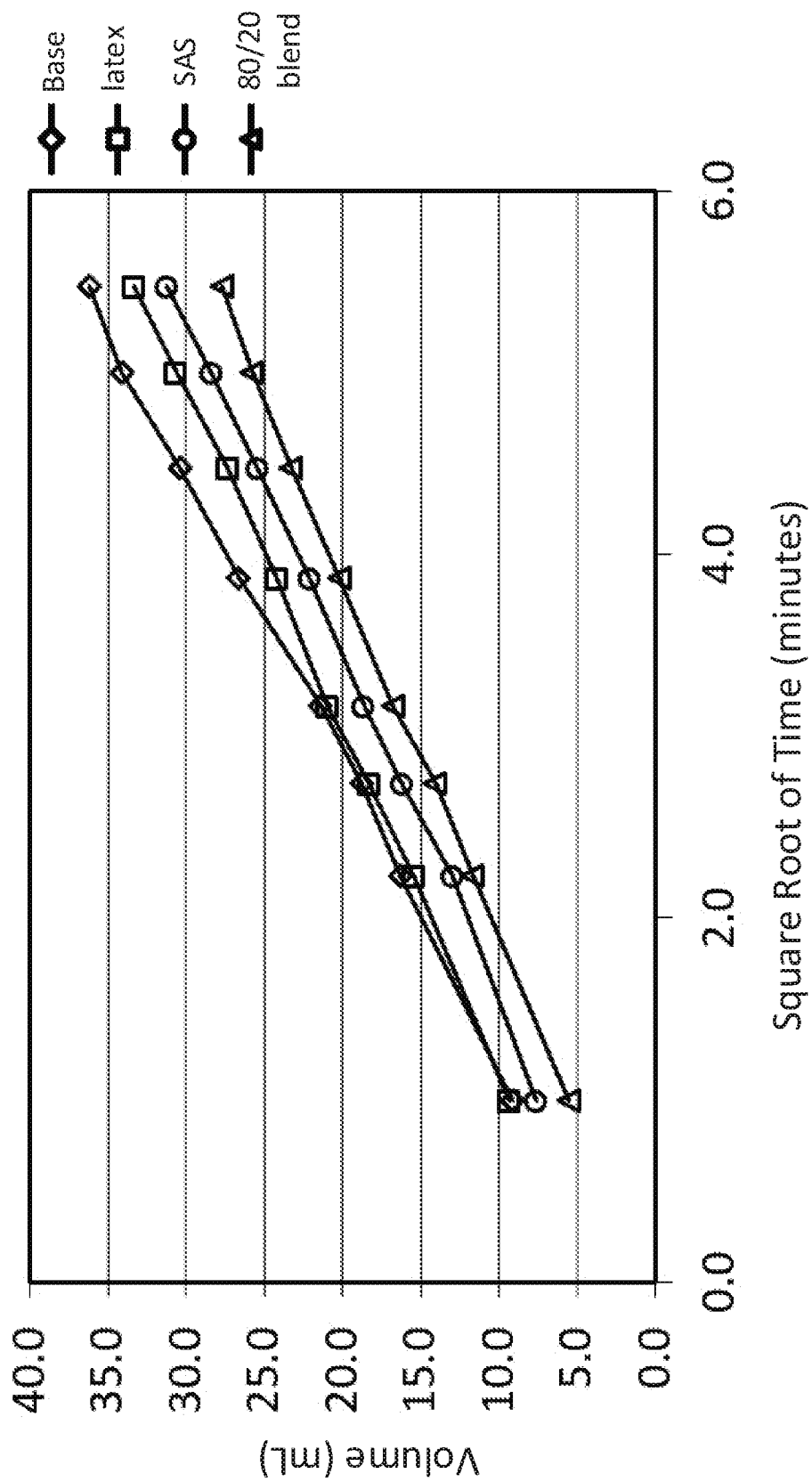
FIG. 4 is a chart illustrating PPT fluid loss at 325° F. for water-based drilling mud compositions including both SAS and powdered latex and having a greater concentration by mass of SAS than that of powdered latex relative to compositions that do not include one or both of SAS or latex.

FIG. 4 is a chart illustrating the PPT fluid loss at 325° F. for the water-based drilling mud compositions including both SAS and powdered latex and having a greater concentration of SAS than that of powdered latex relative to compositions that do not include one or both of SAS or latex.

Sample D4 with the 80/20 SAS-latex blend generally exhibited a decrease in PPT compared to samples A4 (base), B4 (SAS), and C4 (latex).

Example 5

The properties of water-based drilling mud compositions including different concentrations of powdered latex and sodium asphalt sulfonate (SAS) were evaluated. The PPT fluid loss for base sample A4 of EXAMPLE 4 and sample D4 including an 80/20 SAS-latex blend were determined at 250° F., 275° F., and at 300° F. The PPT loss and spurt loss of samples A4 and D4 are presented in TABLE 10.

TABLE 10

| | PPT Fluid Loss | | | | | |
|---|---|---|---|---|---|---|
| | A4 (base) | D4 (80/20 SAS-latex) | A4 (base) | D4 (80/20 SAS-latex) | A4 (base) | D4 (80/20 SAS-latex) |
| | Temperature | | | | | |
| Minutes | 250° F. | 250° F. | 275° F. | 275° F. | 300° F. | 300° F. |
| 1 | 3.31 | 1.11 | 3.32 | 2.66 | 3.83 | 2.80 |
| 5 | 6.59 | 3.99 | 6.74 | 5.69 | 7.87 | 6.16 |
| 7.5 | 7.92 | 4.99 | 8.41 | 6.65 | 9.90 | 8.06 |
| 10 | 9.16 | 5.96 | 9.59 | 8.15 | 11.61 | 9.11 |
| 15 | 11.05 | 8.12 | 12.05 | 10.27 | 14.15 | 11.61 |
| 20 | 12.67 | 10.34 | 14.24 | 12.05 | 16.54 | 13.63 |
| 25 | 14.37 | 10.73 | 16.09 | 13.60 | 18.74 | 15.40 |
| 30 | 15.77 | 12.50 | 17.63 | 14.49 | 20.32 | 16.96 |
| PPT | 31.54 | 25.00 | 35.26 | 28.98 | 40.64 | 33.92 |
| Spurt Loss | 0.9 | 0.0 | 0.0 | 0.0 | 0.0 | 0.00 |

Figure 5:
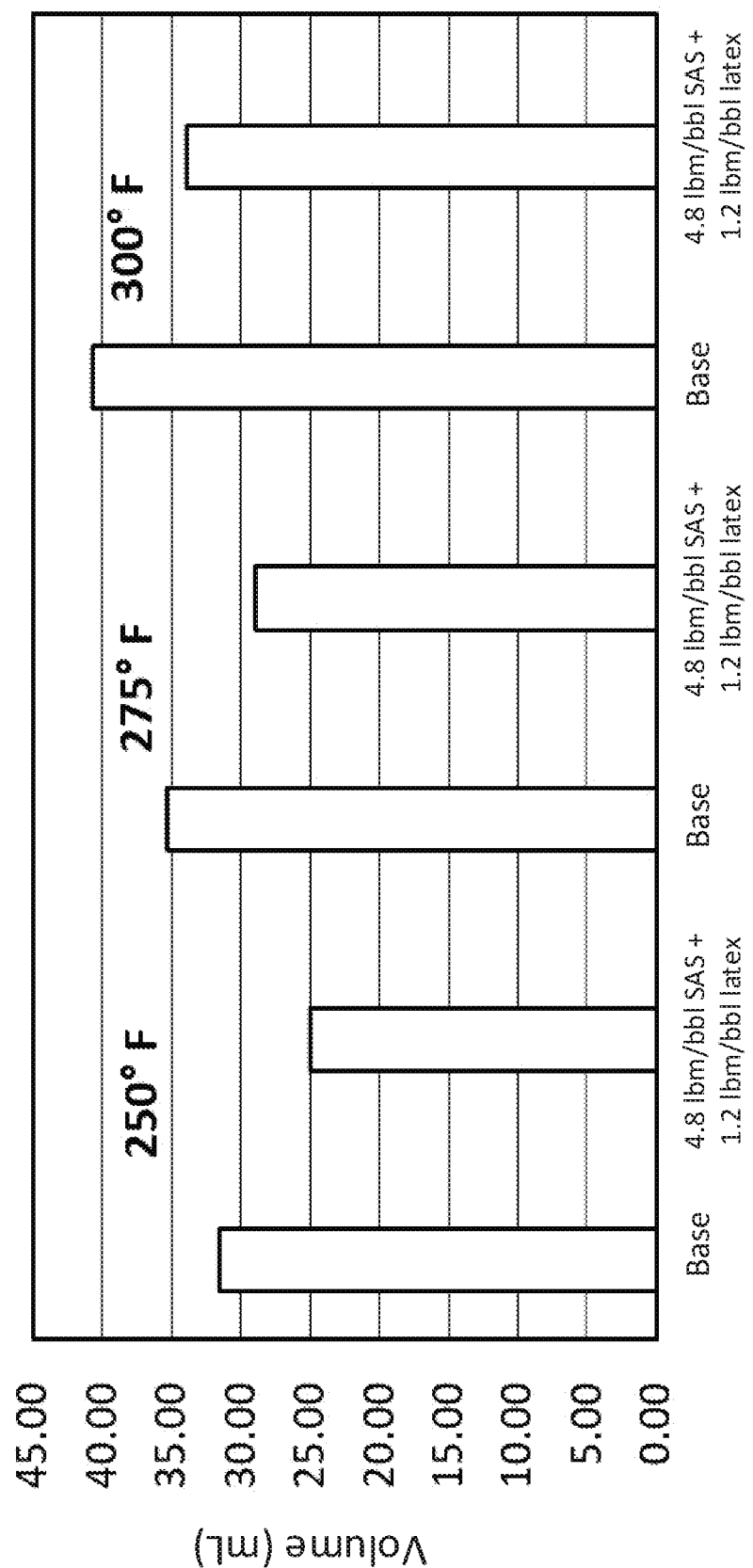
FIG. 5 is a chart illustrating lowered PPT fluid loss over time for water-based drilling mud compositions including both SAS and powdered latex and having a greater concentration by mass of SAS than that of powdered latex relative to compositions that do not include SAS or latex at different temperatures (250° F., 275° F., and 300° F.).

FIG. 5 is a chart illustrating the lowered PPT fluid loss for water-based drilling mud compositions including both SAS and powdered latex and having a greater concentration of SAS than that of powdered latex relative to compositions that do not include SAS or latex at different temperatures (250° F., 275° F., and 300° F.).

As seen in TABLE 10 and FIG. 5, the mud with 80/20 SAS-latex blend was stable between 250° F. and 300° F.

Example 6

The properties of water-based drilling mud compositions including the same SAS-latex ratio, but different types of powdered latex were evaluated. A base composition was prepared similar to that of EXAMPLE 3. Four samples were prepared: A6) base, B6) base with 4.8 lbm/bbl SAS and 1.2 lbm/bbl powdered latex type A (a styrene butadiene copolymer, Axilat™ PSB 150, also known as XP-211, Synthomer, Roebuck, South Carolina) (80/20 or 4:1 SAS-latex blend), C6) base with 4.8 lbm/bbl SAS and 1.2 lbm/bbl powdered latex type B (VAE-RS 1220, Riteks, Houston, Tex.) (80/20 or 4:1 SAS-latex blend), and D6) base with 4.8 lbm/bbl SAS and 1.2 lbm/bbl powdered latex type C (VAE-RS 1420, Riteks, Houston, Tex.) (80/20 or 4:1 SAS-latex blend). The samples were hot rolled for 16 hours at 250° F. The rheological properties of samples A6 to D6 were determined and are presented in TABLE 11.

TABLE 11

| Rheology @ 120° F. | A6 (base) | B6 (80/20 SAS-latex A) | C6 (80/20 SAS-latex B) | D6 (80/20 SAS-latex C) |
|---|---|---|---|---|
| Viscosity at 600 rpm (cP) | 68.7 | 61.0 | 55.6 | 52.6 |
| Viscosity at 300 rpm (cP) | 47.4 | 41.4 | 38.1 | 35.7 |
| Viscosity at 200 rpm (cP) | 38.1 | 33.4 | 31.0 | 29.2 |
| Viscosity at 100 rpm (cP) | 26.4 | 23.2 | 21.5 | 19.5 |
| Viscosity at 6 rpm (cP) | 7.1 | 6.8 | 6.2 | 5.5 |
| Viscosity at 3 rpm (cP) | 6.0 | 5.7 | 5.0 | 4.1 |
| Plastic viscosity (cP) | 21.3 | 19.6 | 17.5 | 16.9 |
| Yield point (lb/100 ft$^2$) | 26.1 | 21.8 | 20.6 | 18.8 |
| Gel strength (lb/100 ft$^2$) (10 second/10 minute) | 5.7/13.1 | | 5.2/10.6 | 4.7/9.2 |

The PPT fluid loss and spurt loss for samples A6 to D6 were determined at 275° F. and are presented in TABLE 12.

TABLE 12

| | | PPT Fluid Loss @ 275° F | | |
|---|---|---|---|---|
| Minutes | A6 (base) | B6 (80/20 SAS-latex A) | C6 (80/20 SAS-latex B) | D6 (80/20 SAS-latex C) |
| 1 | 3.83 | 2.80 | 3.34 | 2.99 |
| 5 | 7.87 | 6.16 | 6.43 | 6.62 |
| 7.5 | 9.90 | 8.06 | 7.67 | 9.75 |
| 10 | 11.61 | 9.11 | 9.05 | 8.87 |
| 15 | 14.15 | 11.61 | 11.64 | 1.12 |
| 20 | 16.59 | 13.63 | 12.76 | 12.95 |
| 25 | 18.74 | 15.40 | 14.24 | 14.54 |
| 30 | 20.32 | 16.96 | 15.24 | 15.42 |
| PPT (mL) | 40.64 | 33.92 | 30.48 | 30.84 |
| Spurt Loss (mL) | 0.0 | 0.0 | 1.2 | 0.6 |

Figure 6:
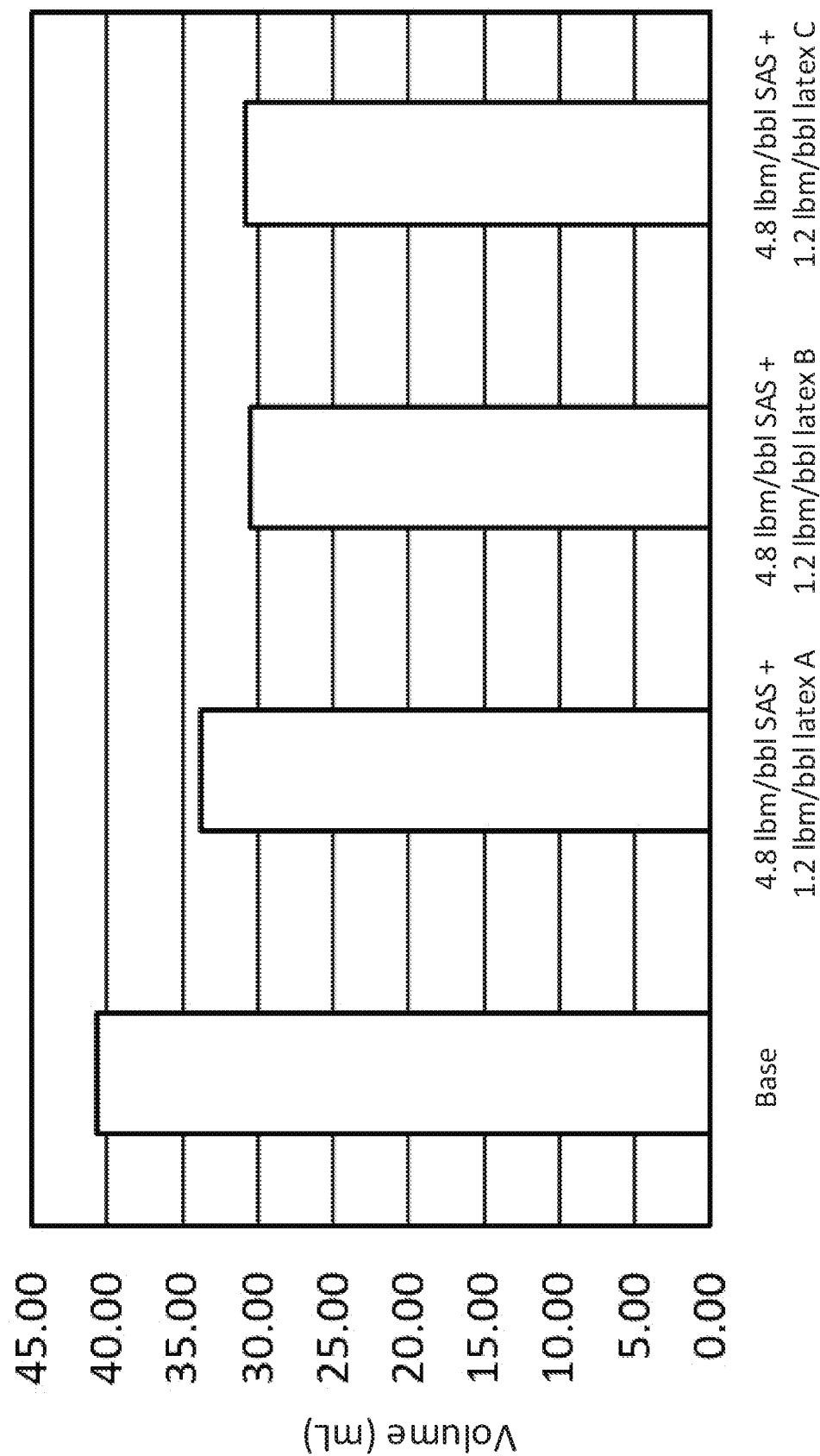
FIG. 6 is a chart illustrating lowered PPT fluid loss at 275° F. for water-based drilling mud compositions including both SAS and different types of powdered latex and having a greater concentration by mass of SAS than that of powdered latex relative to compositions that do not include SAS.

FIG. 6 is a chart illustrating PPT fluid loss at 275° F. for water-based drilling mud compositions including both SAS and different types of powdered latex and having a greater concentration of SAS than that of powdered latex relative to compositions that do not include SAS.

Different types of powdered latex in SAS-latex blends exhibited generally similar properties and exhibited generally similar reduction in PPT loss.

Example 7

The properties of oil-based drilling mud compositions including different concentrations of SAS and latex were evaluated. The base mud composition included 5.0 lbm/bbl of oleophilic clay, 6.0 lbm/bbl of a primary emulsifier, 6.0 lbm/bbl of an oil wetting agent, 0.5 lbm/bbl of Rev Dust™ Inert Particulate (Milwhite, Inc., Brownsville, Tex.), 25% of calcium chloride, 144.3 lbm/bbl of barite, 6.0 lbm/bbl of lime, and had an oil-water ratio of 85/15. The base composition had a density of 11.0 lbm/gal.

Five samples were prepared: A7) base, B7) base with 2.0 lbm/bbl powdered latex, C7) base with 4.0 lbm/bbl SAS, D7) base with 3.0 lbm/bbl SAS and 1.0 lbm/bbl powdered latex (75/25 or 3:1 SAS-latex blend), and E7) base with 2.0 lbm/bbl SAS and 2.0 lbm/bbl powdered latex (50/50 or 1:1 SAS-latex blend). The samples were hot rolled for 16 hours at 250° F. The rheological properties of samples A7 to E7 were determined, and are presented in TABLE 13

TABLE 13

| Rheology @ 120° F. | A7 (base) | B7 (latex) | C7 (SAS) | D7 (75/25 SAS-latex) | E7 (50/50 SAS-latex) |
|---|---|---|---|---|---|
| Viscosity at 600 rpm (cP) | 63.6 | 65.0 | 54.5 | 60.1 | 64.7 |
| Viscosity at 300 rpm (cP) | 36.4 | 40.1 | 29.6 | 33.0 | 35.3 |
| Viscosity at 200 rpm (cP) | 30.6 | 32.3 | 23.0 | 22.8 | 24.7 |
| Viscosity at 100 rpm (cP) | 20.0 | 21.5 | 13.1 | 12.8 | 14.3 |
| Viscosity at 6 rpm (cP) | 10.4 | 10.8 | 3.2 | 3.2 | 5.7 |
| Viscosity at 3 rpm (cP) | 9.5 | 10.7 | 2.7 | 2.2 | 5.3 |
| Plastic viscosity (cP) | 27.2 | 24.9 | 25.0 | 27.1 | 29.4 |
| Yield point (lb/100 ft$^2$) | 9.2 | 15.2 | 4.6 | 5.9 | 5.9 |
| Gel strength (lb/100 ft$^2$) (10 second/10 minute) | 17.3/34.3 | 8.4/32.8 | 2.6/24.2 | 2.7/27.1 | 10.6/35.9 |
| Electrical stability (V) | 1480 | 1548 | 1500 | 992 | 965 |

The PPT fluid loss and spurt loss for samples A7 to E7 were determined at 275° F. and are presented in TABLE 14.

TABLE 14

| | | PPT Fluid Loss @ 275° F. | | | |
|---|---|---|---|---|---|
| Minutes | A7 (base) | B7 (latex) | C7 (SAS) | D7 (75/25 SAS-latex) | E7 (50/50 SAS-latex) |
| 1 | 1.05 | 1.01 | 0.47 | 0.34 | 0.42 |
| 5 | 1.20 | 1.73 | 0.76 | 0.63 | 0.72 |
| 7.5 | 2.40 | 2.08 | 0.95 | 0.74 | 0.84 |
| 10 | 2.57 | 2.34 | 1.07 | 0.88 | 1.00 |
| 15 | 3.44 | 2.78 | 1.28 | 1.10 | 1.21 |
| 20 | 3.97 | 3.19 | 1.44 | 1.25 | 1.37 |
| 25 | 4.32 | 3.59 | 1.59 | 1.38 | 1.57 |
| 30 | 4.69 | 3.91 | 1.68 | 1.51 | 1.65 |
| PPT (mL) | 9.38 | 7.82 | 3.36 | 3.02 | 3.30 |
| Spurt Loss (mL) | 0.0 | 0.6 | 0.4 | 0.1 | 0.2 |

Figure 7:
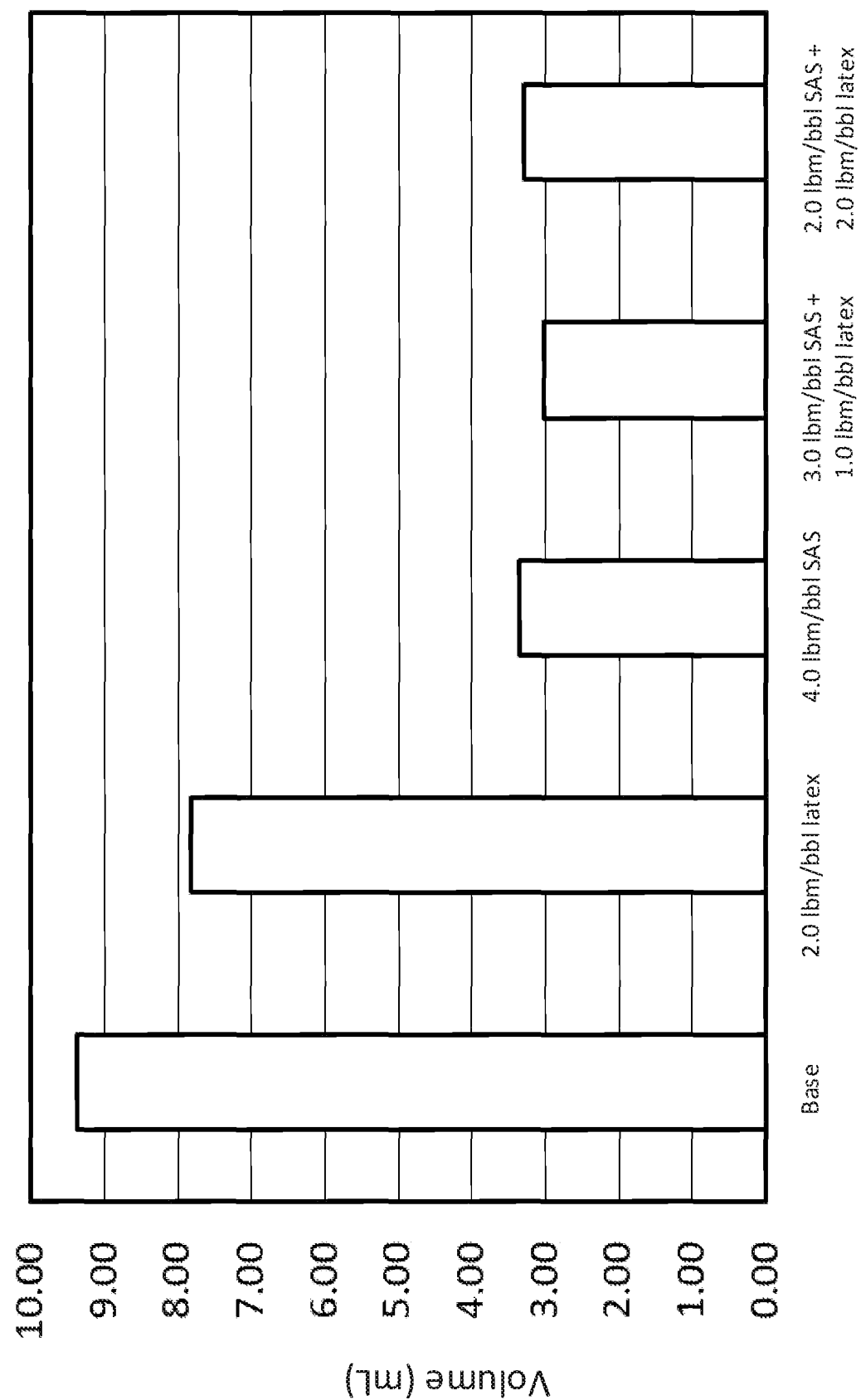
FIG. 7 is a chart illustrating lowered PPT fluid loss at 275° F. oil-based drilling mud compositions including both SAS and powdered latex and having SAS in a concentration by mass that is greater than or equal to that of powdered latex relative to compositions that do not include one or both of SAS or latex.

FIG. 7 is a chart illustrating the lowered PPT fluid loss at 275° F. for oil-based drilling mud compositions including both SAS and powdered latex and having SAS in a concentration that is greater than or equal to that of powdered latex relative to compositions that do not include one or both of SAS or latex.

Samples D7 (75/25 SAS-latex) and E7 (50/50 SAS-latex) exhibited lower PPT loss and spurt loss relative to samples A7 (base), B7 (latex), and C7 (SAS).

Example 8

The properties of oil-based drilling mud compositions including different concentrations of SAS and latex were evaluated. The base mud composition included 4.3 lbm/bbl of oleophilic clay, 4.25 lbm/bbl of a primary emulsifier, 0.8 lbm/bbl of an oil wetting agent, 1.0 lbm/bbl of a secondary emulsifier, 21.50 lbm/bbl of calcium chloride, 53 lbm/bbl of barite, 1.86 lbm/bbl of lime, and had an oil-water ratio of 85/15. The base composition had a density of 9.33 lbm/gal.

Four samples were prepared: A8) base, B8) base with 2.0 lbm/bbl powdered latex, C8) base with 4.0 lbm/bbl SAS, D8) base with 2.0 lbm/bbl SAS and 2.0 lbm/bbl powdered latex (50/50 or 1:1 SAS-latex blend). The samples were hot rolled for 16 hours at 250° F. The rheological properties of samples A8 to D8 were determined and are presented in TABLE 15.

TABLE 15

| Rheology @ 120° F. | A8 (base) | B8 (latex) | C8 (SAS) | D8 (50/50 SAS-latex) |
|---|---|---|---|---|
| Viscosity at 600 rpm (cP) | 63.6 | 65.0 | 54.5 | 64.7 |
| Viscosity at 300 rpm (cP) | 36.4 | 40.1 | 29.6 | 35.3 |
| Viscosity at 200 rpm (cP) | 30.6 | 32.3 | 23.0 | 24.7 |
| Viscosity at 100 rpm (cP) | 20.0 | 21.5 | 13.1 | 14.3 |
| Viscosity at 6 rpm (cP) | 10.4 | 10.8 | 3.2 | 5.7 |
| Viscosity at 3 rpm (cP) | 9.5 | 10.7 | 2.7 | 5.3 |
| Plastic viscosity (cP) | 27.2 | 24.9 | 25.0 | 29.4 |
| Yield point (lb/100 ft$^2$) | 9.2 | 15.2 | 4.6 | 5.9 |
| Gel strength (lb/100 ft$^2$) (10 second/10 minute) | 17.3/34.3 | 18.4/32.8 | 2.6/24.2 | 10.6/35.9 |
| Electrical stability (V) | 1480.0 | 1548.0 | 1500.0 | 965.0 |

The PPT fluid loss and spurt loss for samples A8 to D8 were determined at 300° F. and are presented in TABLE 16.

TABLE 16

| | PPT Fluid Loss @ 300° F. | | | |
|---|---|---|---|---|
| Minutes | A8 (base) | B8 (latex) | C8 (SAS) | D8 (50/50 SAS-latex) |
| 1 | 0.89 | 0.35 | 0.48 | 0.30 |
| 5 | 1.40 | 0.68 | 0.91 | 0.63 |
| 7.5 | 1.79 | 0.94 | 1.39 | 0.85 |
| 10 | 1.90 | 1.04 | 1.51 | 1.07 |
| 15 | 2.11 | 1.25 | 1.72 | 1.23 |
| 20 | 2.23 | 1.36 | 1.84 | 1.37 |
| 25 | 2.40 | 1.51 | 1.96 | 1.49 |
| 30 | 2.52 | 1.66 | 2.07 | 1.57 |
| PPT (mL) | 5.04 | 3.32 | 4.14 | 3.14 |
| Spurt Loss (mL) | 1.1 | 0.1 | 0.2 | 0.0 |

Figure 8:
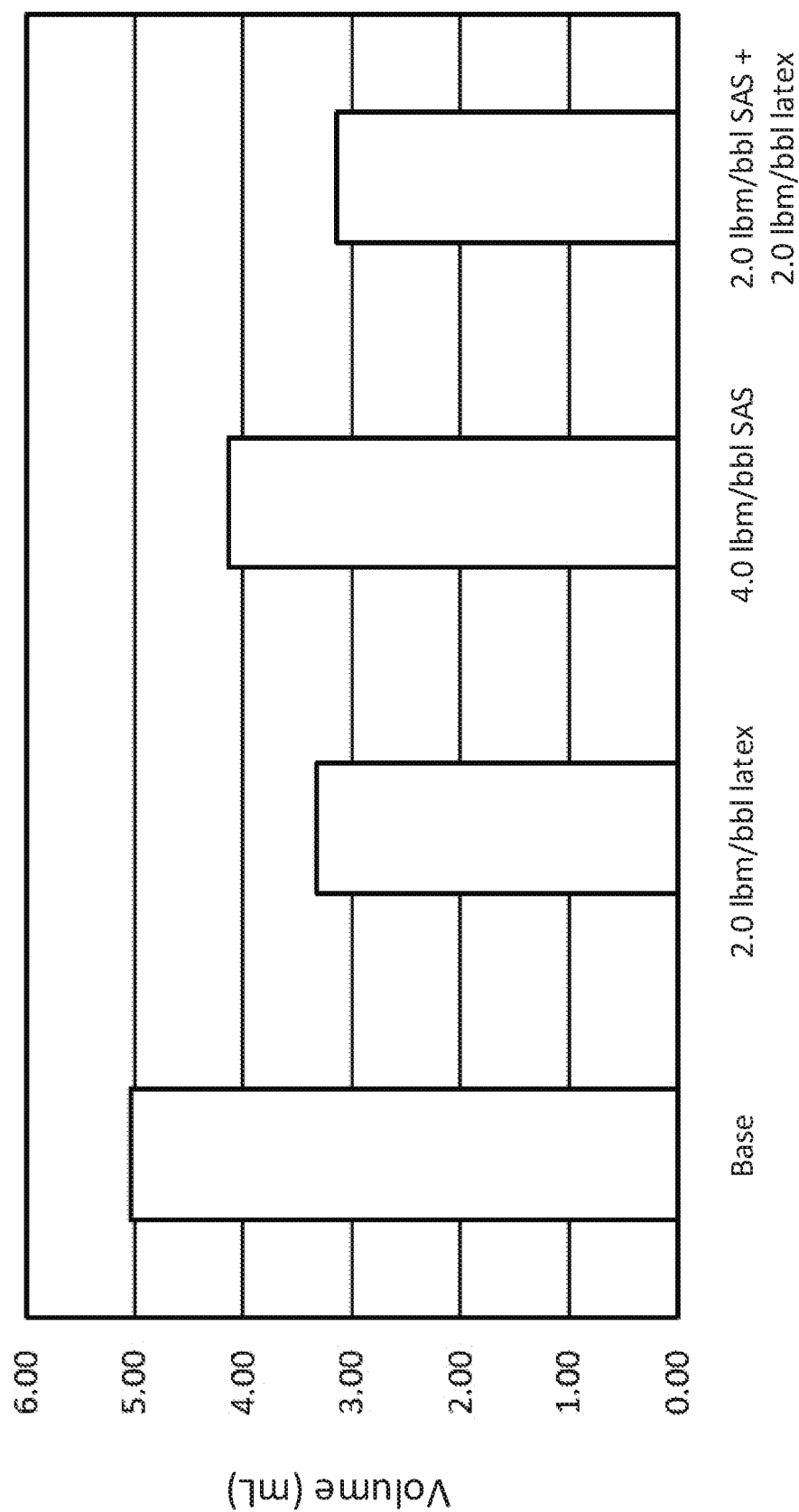
FIG. 8 is a chart illustrating lowered PPT fluid loss at 300° F. for oil-based drilling mud compositions including both SAS and powdered latex and having SAS in a concentration by mass that is equal to that of powdered latex relative to compositions that do not include one or both of SAS or latex.

FIG. 8 is a chart illustrating the lowered PPT fluid loss at 300° F. for oil-based drilling mud compositions including both SAS and powdered latex and having SAS in a concentration that is equal to that of powdered latex relative to compositions that do not include one or both of SAS or latex.

Sample D8 (50/50 SAS-latex blend) exhibited a lowered PPT loss compared to samples A8 (base), B8 (latex), and C8 (SAS).

Example 9

The properties of oil-based drilling mud compositions including different concentrations of SAS and latex were evaluated. The base mud composition included 4.0 lbm/bbl of oleophilic clay, 5 lbm/bbl of a primary emulsifier, 4 lbm/bbl of an oil wetting agent, 25% of calcium chloride, 302 lbm/bbl of barite, 4 lbm/bbl of lime, and had an oil-water ratio of 85/15. The base composition had a density of 13.6 lbm/gal.

Four samples were prepared: A9) base, B9) base with 4.0 lbm/bbl powdered latex, C9) base with 4.0 lbm/bbl SAS, D9) base with 2.0 lbm/bbl SAS and 2.0 lbm/bbl powdered latex (50/50 or 1:1 SAS-latex blend). The samples were hot rolled for 16 hours at 250° F. The rheological properties of samples A9 to D9 were determined and are presented in TABLE 17.

TABLE 17

| Rheology @ 120° F. | A9 (base) | B9 (latex) | C9 (SAS) | D9 (50/50 SAS-latex) |
|---|---|---|---|---|
| Viscosity at 600 rpm (cP) | 142.7 | 185.0 | 138.2 | 161.4 |
| Viscosity at 300 rpm (cP) | 84.6 | 108.9 | 74.4 | 95.8 |
| Viscosity at 200 rpm (cP) | 64.7 | 81.2 | 60.4 | 74.1 |
| Viscosity at 100 rpm (cP) | 41.1 | 50.9 | 35.5 | 46.5 |
| Viscosity at 6 rpm (cP) | 12.8 | 14.8 | 10.3 | 14.1 |
| Viscosity at 3 rpm (cP) | 10.7 | 12.9 | 9.2 | 12.2 |
| Plastic viscosity (cP) | 58.1 | 76.1 | 54.4 | 65.6 |
| Yield point (lb/100 ft$^2$) | 26.5 | 32.8 | 22.5 | 30.2 |
| Gel strength (lb/100 ft$^2$) (10 second/10 minute) | 11.7/14.5 | 14/18.2 | 5.614.2 | 13.1/16.4 |
| Electrical stability (V) | 339.0 | 399.0 | 400.0 | 428.0 |

The PPT fluid loss and spurt loss for samples A9 to D9 were determined at 300° F. and are presented in TABLE 18.

TABLE 18

| | PPT Fluid Loss @ 300° F. | | | |
|---|---|---|---|---|
| Minutes | A9 (base) | B9 (latex) | C9 (SAS) | D9 (50/50 SAS-latex) |
| 1 | 0.24 | 0.12 | 0.24 | 0.11 |
| 5 | 0.49 | 0.22 | 0.41 | 0.21 |
| 7.5 | 0.77 | 0.30 | 0.49 | 0.25 |
| 10 | 0.85 | 0.36 | 0.53 | 0.28 |
| 15 | 0.95 | 0.44 | 0.66 | 0.38 |
| 20 | 1.04 | 0.59 | 0.73 | 0.45 |
| 25 | 1.14 | 0.66 | 0.76 | 0.50 |
| 30 | 1.22 | 0.71 | 0.84 | 0.53 |
| PPT (mL) | 2.44 | 1.42 | 1.68 | 1.06 |
| Spurt Loss (mL) | 0.0 | 0.0 | 0.2 | 0.0 |

Figure 9:
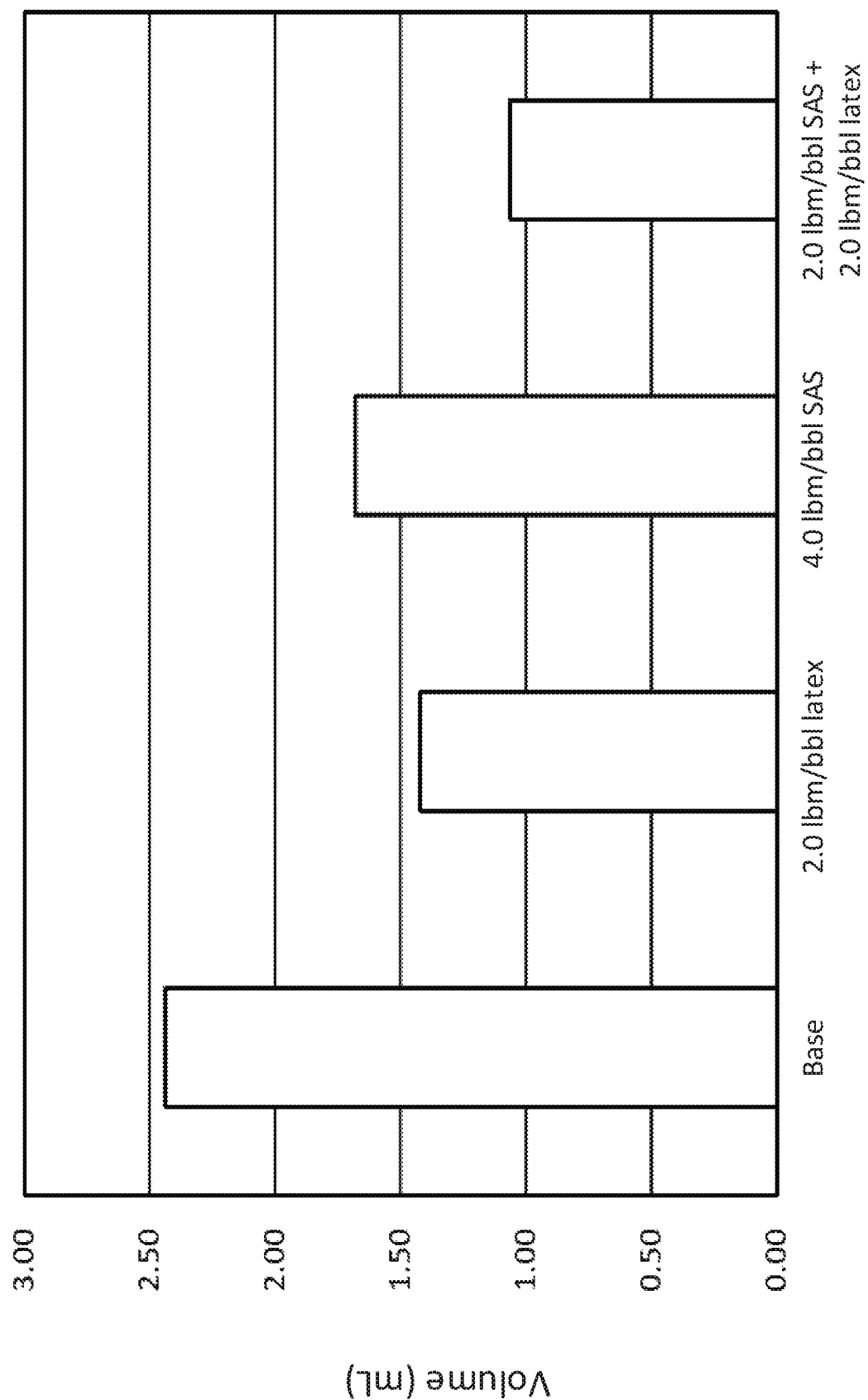
FIG. 9 is a chart illustrating lowered PPT fluid loss at 300° F. for oil-based drilling mud compositions including both SAS and latex and having SAS in a concentration by mass that is equal to that of powdered latex relative to compositions that do not include one or both of SAS or latex.

FIG. 9 is a chart illustrating the lowered PPT fluid loss at 300° F. for oil-based drilling mud compositions including both SAS and latex and having SAS in a concentration that is equal to that of powdered latex relative to compositions that do not include one or both of SAS or latex.

Sample D9 (50/50 SAS-latex blend) exhibited a lowered PPT loss compared to samples A9 (base), B9 (latex), and C9 (SAS).

Example 10

The properties of water-based drilling mud compositions including different additives were determined. A base mud composition included 7.0 pounds per barrel (lbm/bbl) of bentonite, 2 lbm/bbl of polyanionic cellulose, 0.75 lbm/bbl of a biopolymer, 10 lbm/bbl of Rev Dust™ Inert Particulate (Milwhite, Inc., Brownsville, Tex.), 0.5 lbm/bbl of caustic soda, and 2 lbm/bbl of sodium sulfite. The base composition had a density of 9.5 lbm/gal.

Ten samples were prepared: A10) base, B10) base with 6 lbm/bbl SAS mixed with causticized lignite (Soltex®, Drilling Specialties Company, The Woodlands, Tex.), C10) base with 6 lbm/bbl of asphalt 1 (Anco Phalt™, Anchor Drilling Fluids, Tulsa, Okla.), D10) base with 6 lbm/bbl of asphalt 2 (Asphasol Supreme™, MI Swaco, Houston, Tex.), E10) base with 6 lbm/bbl of asphalt 3 (Baro-Trol® Plus, Halliburton, Houston, Tex.), F10) base with 6 lbm/bbl of asphalt 4 (Martrol, Marbar S.R.L., Buenos Aires, Argentina), G10) base with 6 lbm/bbl of asphalt 5 (NewPhalt™, Newpark Drilling Fluids, The Woodlands, Tex.), H10) base with 6 lbm/bbl of gilsonite 1 (Super-Bore-Trol™, Servicios Petroleros ZV, Monterrey, Mexico) I10) base with 6 lbm/bbl of gilsonite 2 (Super Shield™, Patriot, Kenner, La.), and J10) base with 4.8 lbm/bbl SAS and 1.2 lbm/bbl powdered latex (latex blend) (4:1 or 80/20 SAS-latex blend). The samples were hot rolled for 16 hours at 250° F. The PPT loss and spurt loss of the samples were determined at 275° F. and are presented in TABLE 19.

TABLE 19

| | PPT Fluid Loss @ 275° F. | | | | | | | | | |
|---|---|---|---|---|---|---|---|---|---|---|
| Minutes | A10 | B10 | C10 | D10 | E10 | F10 | G10 | H10 | I10 | J10 |
| 1 | 3.98 | 2.14 | 2.24 | 3.66 | 4.31 | 4.17 | 4.04 | 2.86 | 3.34 | 1.70 |
| 5 | 7.02 | 4.30 | 4.51 | 6.30 | 6.27 | 6.70 | 6.04 | 5.22 | 5.73 | 4.10 |
| 7.5 | 8.53 | 5.05 | 5.21 | 7.47 | 7.28 | 7.89 | 7.18 | 6.08 | 6.66 | 4.80 |
| 10 | 9.38 | 5.83 | 5.85 | 8.35 | 7.89 | 8.93 | 7.80 | 6.84 | 7.53 | 5.50 |
| 15 | 11.43 | 7.48 | 6.83 | 10.25 | 8.82 | 10.10 | 8.87 | 7.67 | 8.61 | 6.83 |
| 20 | 12.99 | 8.44 | 8.61 | 11.79 | 9.86 | 11.65 | 9.90 | 9.09 | 9.49 | 7.56 |
| 25 | 14.42 | 9.30 | 9.24 | 13.30 | 10.85 | 11.93 | 10.93 | 10.06 | 10.75 | 8.83 |
| 30 | 15.32 | 10.38 | 9.92 | 13.97 | 11.47 | 13.05 | 11.96 | 10.92 | 11.67 | 9.45 |
| PPT (mL) | 39.12 | 20.76 | 19.84 | 27.94 | 22.94 | 26.10 | 23.92 | 21.84 | 23.34 | 18.90 |
| Spurt Loss (mL) | 2.8 | 0.5 | 1.2 | 2.5 | 5.4 | 4.5 | 4.3 | 2.3 | 3.1 | 0.2 |

Figure 10:
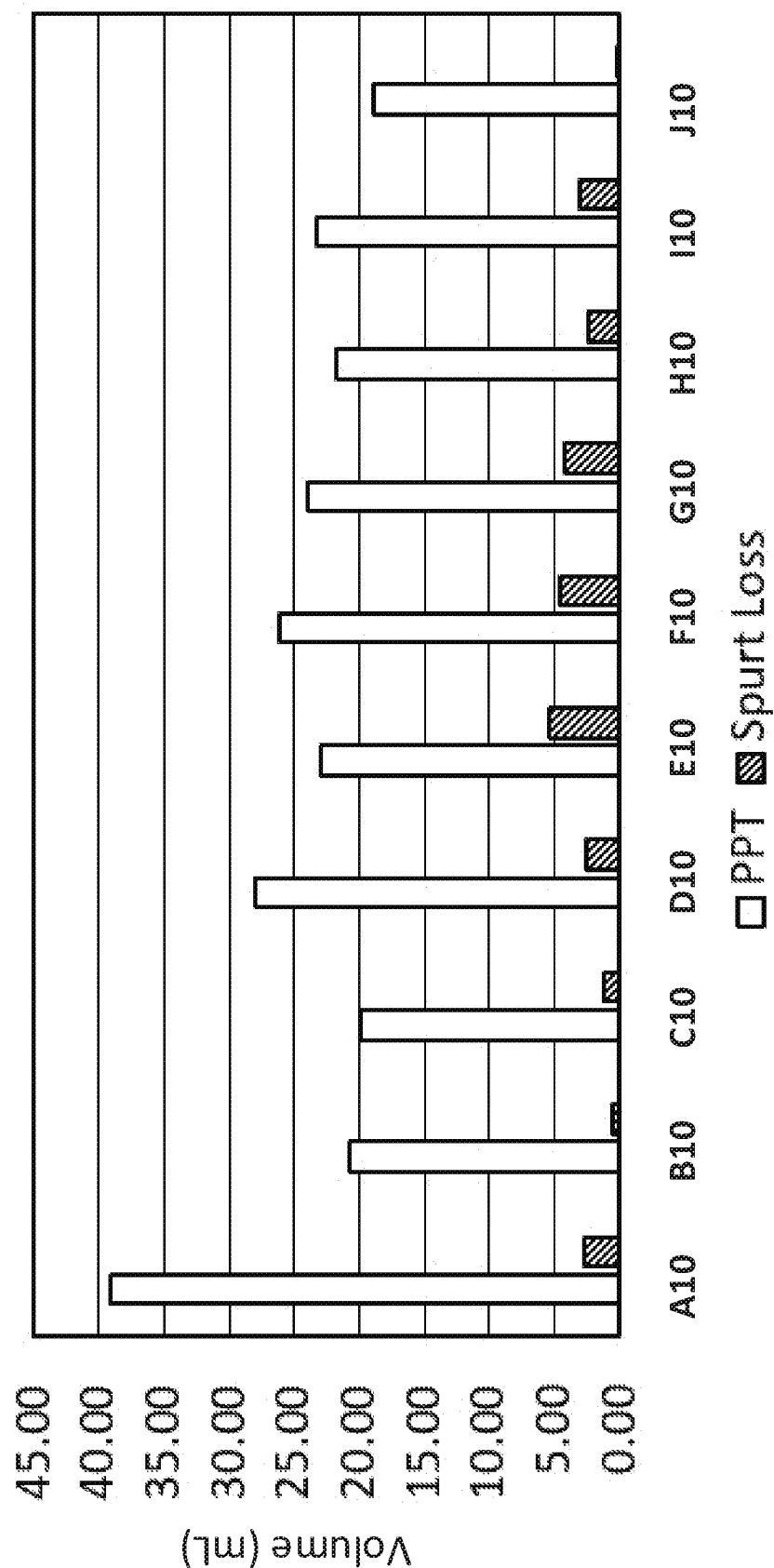
FIG. 10 is a chart illustrating lowered PPT fluid loss and spurt loss at 275° F. for water-based drilling mud compositions including both SAS and powdered latex and having SAS in a concentration by mass that is greater than that of powdered latex relative to compositions including other additives.

FIG. 10 is a chart illustrating lowered PPT fluid loss and spurt loss at 275° F. for water-based drilling mud compositions including both SAS and powdered latex and having SAS in a concentration that is greater than that of powdered latex relative to compositions including other additives.

Sample J10 including the SAS-latex blend exhibited a lower PPT loss and spurt loss than all other samples.

Example 11

The properties of oil-based drilling mud compositions including different additives were determined. The base mud composition included 9.0 lbm/bbl of oleophilic clay, 4.0 lbm/bbl of a primary emulsifier, 6.0 lbm/bbl of an oil wetting agent, 20 lbm/bbl of Rev Dust™ Inert Particulate (Milwhite, Inc., Brownsville, Tex.), 161.2 lbm/bbl of barite, 6.0 lbm/bbl of lime, 2.0 lbm/bbl of sodium sulfite, and had an oil-water ratio of 85/15. The base composition had a density of 11.0 lbm/gal.

Ten samples were prepared: A11) base, B11) base with 2 lbm/bbl gilsonite 1 (BARABLOK™ filtration control additive, Halliburton, Houston, Tex.), C11) base with 2 lbm/bbl of asphalt 1 (BARO-TROL® PLUS shale stabilizer, Halliburton, Houston, Tex.), D11) base with 2 lbm/bbl of asphalt 2 (Carbo-Trol™ fluid loss reducer, Baker Hughes, Houston, Tex.), E11) base with 2 lbm/bbl of gilsonite 2 (Ecco-Block™ filtration control agent, Baker Hughes, Houston, Tex.), F11) base with 1.6 lbm/bbl SAS and 0.4 lbm/bbl powdered latex (4:1 or 80/20 SAS-latex blend), G11) base with 2 lbm/bbl of gilsonite 3 (Gilsonite® HT, American Gilsonite Company, Houston, Tex.), H11) base with 2 lbm/bbl of SAS, I11) base with 6 lbm/bbl of asphalt 3 (xylan), and J11) base with 4.8 lbm/bbl of gilsonite 4 (Versatrol™, MI Swaco, Houston, Tex.). The samples were hot rolled for 16 hours at 250° F.

The rheological properties of the samples were determined at 150° F. and are presented in TABLE 20.

TABLE 20

| | PPT Fluid Loss @ 300° F. | | | | | | | | | |
|---|---|---|---|---|---|---|---|---|---|---|
| | A11 | B11 | C11 | D11 | E11 | F11 | G11 | H11 | I11 | J11 |
| Viscosity at 600 rpm (cP) | 47.9 | 48.9 | 50.8 | 48.4 | 52.4 | 50.3 | 51.8 | 54.4 | 59.5 | 49.9 |
| Viscosity at 300 rpm (cP) | 27.6 | 26.3 | 31.0 | 28.8 | 31 | 27.7 | 30 | 32.2 | 29.6 | 28.9 |
| Viscosity at 200 rpm (cP) | 19.7 | 18.2 | 24.5 | 20.1 | 23.9 | 18.5 | 23.5 | 23.2 | 29.6 | 28.9 |
| Viscosity at 100 rpm(cP) | 13.5 | 12.0 | 16.2 | 13.7 | 14.9 | 12 | 14.7 | 14.6 | 13.7 | 13.1 |
| Viscosity at 6 rpm (cP) | 5.9 | 4.7 | 6.1 | 5.6 | 5.8 | 4.6 | 5.9 | 4.8 | 5.5 | 5.1 |
| Viscosity at 3 rpm (cP) | 5.5 | 4.3 | 5.7 | 5.4 | 5.4 | 4.2 | 5.5 | 4.6 | 5.2 | 4.8 |
| Plastic viscosity (cP) | 20.3 | 22.6 | 19.8 | 19.6 | 21.4 | 22.6 | 21.8 | 22.2 | 20.3 | 21 |
| Yield point (lb/100 ft$^2$) | 7.3 | 3.7 | 11.2 | 9.2 | 9.6 | 5.1 | 8.2 | 10 | 9.3 | 7.9 |
| Gel strength (lb/100 ft$^2$) (10 second/ 10 minute) | 7.4/9.9 | 6.8/8.9 | 8.2/11.1 | 7.6/10.7 | 7.5/9.9 | 7.2/11.6 | 7.7/10.4 | 6.9/11.7 | 7.3/10.3 | 7.1/10.3 |
| Electrical stability (V) | 1367 | 1513 | 1325 | 1364 | 1403 | 1804 | 1558 | 1944 | 1643 | 1680 |

Sample F11 including the SAS-latex blend exhibited a higher electrical stability than all other samples, except for sample H11 including SAS.

The PPT loss and spurt loss of the samples were determined at 300° F. and are presented in TABLE 21.

TABLE 21

| | PPT Fluid Loss @ 300° F. | | | | | | | | | |
|---|---|---|---|---|---|---|---|---|---|---|
| Minutes | A11 | B11 | C11 | D11 | E11 | F11 | G11 | H11 | I11 | J11 |
| 1 | 2.23 | 1.63 | 1.43 | 1.48 | 1.62 | 1.20 | 1.74 | 1.50 | 1.44 | 1.40 |
| 5 | 2.76 | 2.32 | 2.65 | 2.62 | 2.16 | 1.87 | 2.67 | 1.94 | 2.13 | 1.88 |
| 7.5 | 3.26 | 2.85 | 3.15 | 3.02 | 2.57 | 2.14 | 3.07 | 2.46 | 2.48 | 2.32 |
| 10 | 3.62 | 3.06 | 3.87 | 3.49 | 2.74 | 2.55 | 3.87 | 2.68 | 2.74 | 2.59 |
| 15 | 3.95 | 3.39 | 4.54 | 3.99 | 3.01 | 2.76 | 3.67 | 2.95 | 3.11 | 2.96 |
| 20 | 4.21 | 3.59 | 4.97 | 4.45 | 3.24 | 3.01 | 4.03 | 3.24 | 3.45 | 3.22 |
| 25 | 4.51 | 3.85 | 5.37 | 4.82 | 3.52 | 3.24 | 4.35 | 3.52 | 3.70 | 3.45 |
| 30 | 4.77 | 4.09 | 5.73 | 5.09 | 3.83 | 3.50 | 4.70 | 3.80 | 4.07 | 3.65 |
| PPT (mL) | 9.54 | 8.18 | 11.46 | 10.18 | 7.66 | 7.00 | 9.40 | 7.60 | 8.14 | 7.30 |
| Spurt Loss (mL) | 3.10 | 2.41 | 1.09 | 1.58 | 2.31 | 1.53 | 2.43 | 1.92 | 1.70 | 1.60 |

Figure 11:
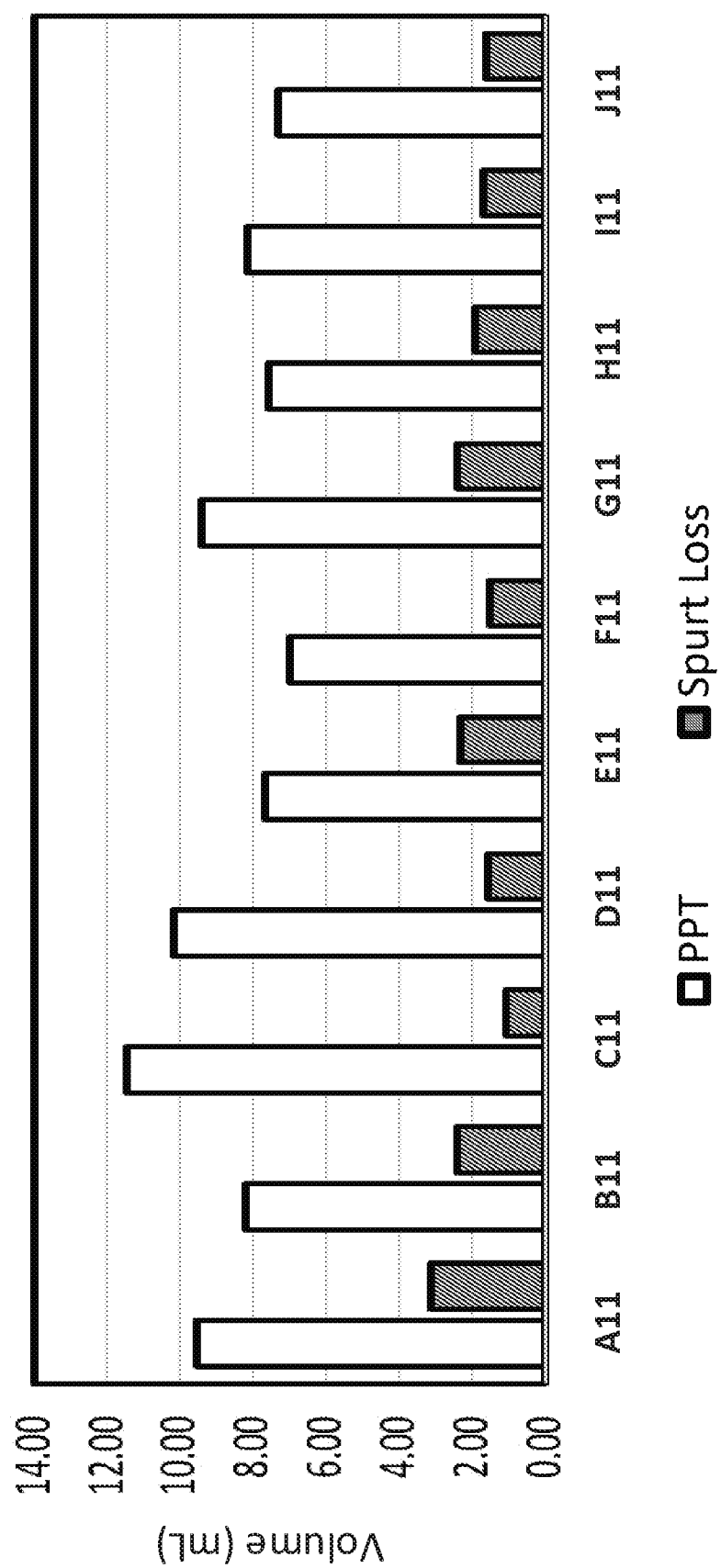
FIG. 11 is a chart illustrating lowered PPT fluid loss and spurt loss at 300° F. for oil-based drilling mud compositions including both SAS and powdered latex and having SAS in a concentration by mass that is greater than that of powdered latex relative to compositions including other additives.

FIG. 11 is a chart illustrating lowered PPT fluid loss and spurt loss at 300° F. for oil-based drilling mud compositions including both SAS and powdered latex and having SAS in a concentration that is greater than that of powdered latex relative to compositions including other additives.

Sample F11 including the SAS-latex blend exhibited a lower PPT loss and spurt loss than all other samples.

Example 12

The properties of water-based drilling mud compositions including different concentrations of SAS and powdered latex were evaluated. A base mud composition included 5.0 pounds per barrel (lbm/bbl) of bentonite, 17.5 lbm/bbl of potassium chloride, 0.5 lbm/bbl of HTHP polymer 1, HTHP polymer 2, 25% of a thinner, 50 lbm/bbl of calcium carbonate, and 0.75 lbm/bbl of caustic. The base composition had a density of 10.0 lbm/gal.

Three samples were prepared: A12) base, B12) base with 6 lbm/bbl SAS, and C12) base with 4.8 lbm/bbl SAS and 1.2 lbm/bbl powdered latex (80/20 or 4:1 SAS-latex blend). The samples were hot rolled for 16 hours at 250° F. The rheological properties of samples A12 to C12 were determined and are presented in TABLE 22.

TABLE 22

| Rheology @ 120° F. | A12 (base) | B12 (SAS) | C12 (80/20 SAS-latex) |
|---|---|---|---|
| Viscosity at 600 rpm (cP) | 90.2 | 103.1 | 99.1 |
| Viscosity at 300 rpm (cP) | 62.4 | 78.4 | 70.4 |
| Viscosity at 200 rpm (cP) | 49.4 | 61.1 | 56.8 |
| Viscosity at 100 rpm (cP) | 34.6 | 43.1 | 40.1 |
| Viscosity at 6 rpm (cP) | 6.7 | 9.5 | 8.1 |
| Viscosity at 3 rpm (cP) | 4.4 | 7.3 | 5.9 |
| Plastic viscosity (cP) | 27.8 | 29.7 | 28.7 |
| Yield point (lb/100 ft$^2$) | 34.6 | 43.7 | 41.7 |
| Gel strength (lb/100 ft$^2$) (10 second/10 minute) | 3.2/5.3 | 9.0/6.1 | 6.3/5.1 |

The HTHP fluid loss and API loss for samples A12 to C12 were determined at 375° F. and are presented in TABLE 23.

TABLE 23

| | HTHP Fluid Loss @ 375° F. | | |
|---|---|---|---|
| Minutes | A12 (base) | B12 (SAS) | C12 (80/20 SAS-latex) |
| 1 | 3.68 | 3.40 | 3.31 |
| 5 | 5.82 | 5.39 | 5.23 |
| 7.5 | 6.83 | 6.30 | 6.19 |
| 10 | 7.35 | 7.11 | 6.91 |
| 15 | 8.69 | 8.45 | 8.32 |
| 20 | 9.82 | 9.68 | 9.48 |
| 25 | 10.79 | 10.68 | 10.46 |
| 30 | 11.60 | 11.50 | 11.25 |
| HTHP (mL) | 23.20 | 23.00 | 22.50 |
| API filtrate (mL) | 3.4 | 4.1 | 3.1 |

Figure 12:
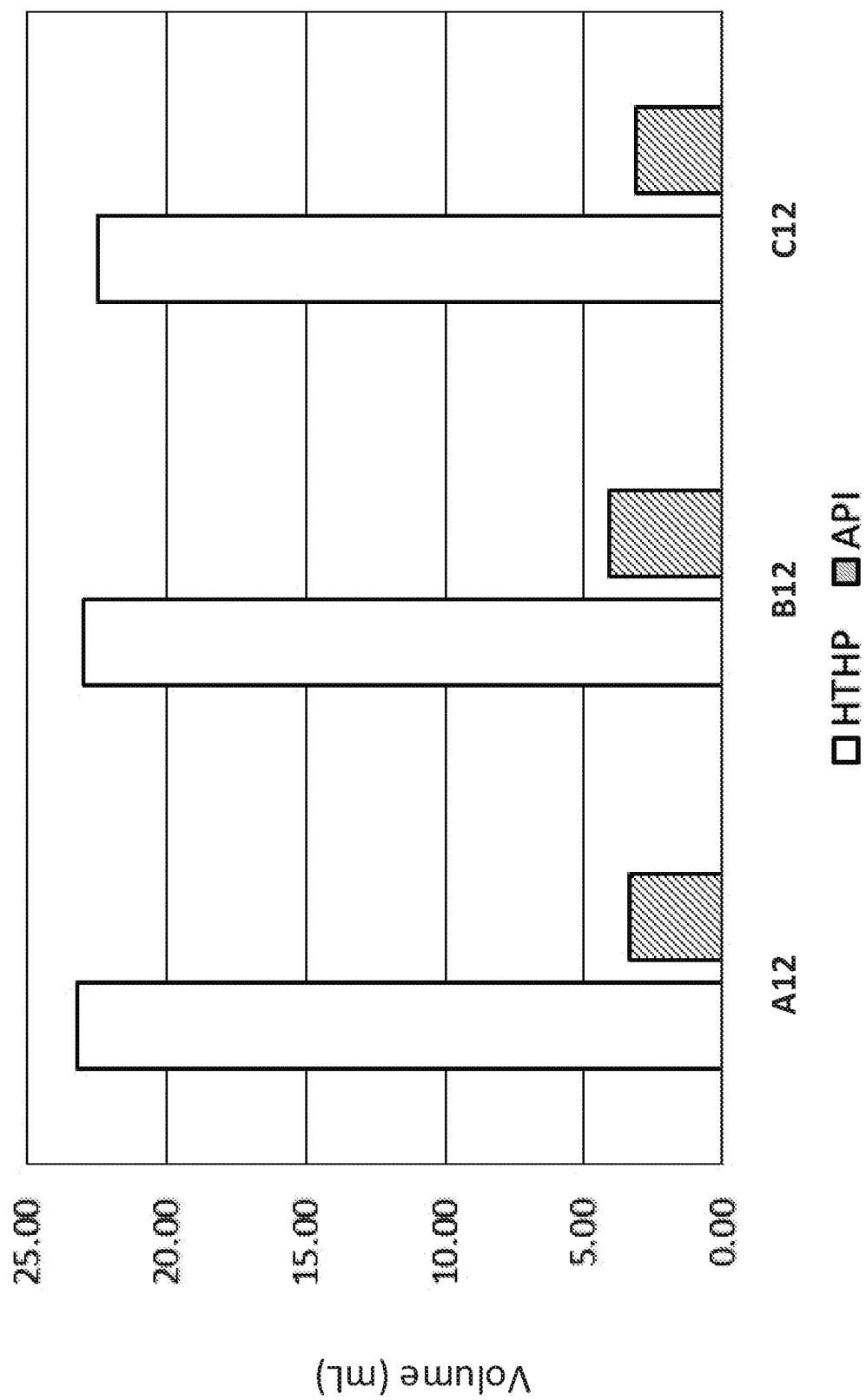
FIG. 12 is a chart illustrating API and HTHP filtrate volumes at 375° F. for water-based drilling mud compositions including both SAS and powdered latex and having SAS in a concentration by mass that is greater than that of powdered latex relative to compositions that do not include one or both of SAS or latex.

FIG. 12 is a chart illustrating API and HTHP filtrate volumes at 375° F. for water-based drilling mud compositions including both SAS and powdered latex and having SAS in a concentration that is greater than that of powdered latex relative to compositions that do not include one or both of SAS or latex.

Sample C12 with the SAS-latex blend exhibited a lower HTHP loss and a lower API loss than the other samples.

Example 13

The properties of water-based drilling compositions including different concentrations of SAS, powdered latex, and liquid latex were determined. A base mud composition included 7.0 pounds per barrel (lbm/bbl) of bentonite, 17.5 lbm/bbl of potassium chloride, 2 lbm/bbl of Drispac® SL Polymer (Drilling Specialties Company, The Woodlands, Tex.), 0.75 lbm/bbl of Flowzan® Biopolymer (Drilling Specialties Company, The Woodlands, Tex.), and .75 lbm/bbl of caustic. The base composition had a density of 9.2 lbm/gal.

Four samples were prepared: A13) base, B13) base with 6 lbm/bbl SAS, C13) base with 4.8 lbm/bbl SAS and 1.2 lbm/bbl powdered latex (80/20 or 4:1 SAS-latex blend), and D13) base with 9 lbm/bbl liquid latex. The samples were hot rolled for 16 hours at 150° F.

The rheological properties and shale recovery of samples A13 to D13 were determined and are presented in TABLE 24.

TABLE 24

| Rheology @ 120° F. | A13 (base) | B13 (SAS) | C13 (80/20 SAS-powdered latex) | D13 (liquid latex) |
|---|---|---|---|---|
| Viscosity at 600 rpm (cP) | 58.8 | 64.1 | 58 | 63.3 |
| Viscosity at 300 rpm (cP) | 39.8 | 44.5 | 39.8 | 42.1 |
| Viscosity at 200 rpm (cP) | 31.8 | 37.2 | 31.8 | 33.3 |
| Viscosity at 100 rpm (cP) | 22.3 | 26.6 | 22.3 | 22.3 |
| Viscosity at 6 rpm (cP) | 6.6 | 8.7 | 6.6 | 5.1 |
| Viscosity at 3 rpm (cP) | 5.2 | 6.7 | 5.2 | 3.7 |
| Plastic viscosity (cP) | 19 | 19.6 | 19 | 21.2 |
| Yield point (lb/100 ft$^2$) | 20.8 | 24.9 | 20.8 | 20.9 |
| Gel strength (lb/100 ft$^2$) (10 second/10 minute) | 5.6/9.5 | 7.3/9.9 | 5.6/9.5 | 4.9/5.8 |
| % shale recovery | 75.82 | 68.07 | 91.7 | 88.95 |

Sample C13 with the SAS-powdered latex blend had the highest shale recovery.

Example 14

Several oil based mud field samples (a first sample was a 13.8 lbm/gallon 82/18 OWR (oil-water ratio) field mud obtained from the Eagle Ford area, and a second sample was a 9.5 lbm/gallon OWR field mud obtained from the Rocky Mountain region) were tested for lubricity using different methods including an extreme pressure (EP) lubricity meter and dynamic lubricity evaluation monitor (LEM). A solid-state lubricant (4:1 or 80/20 SAS-latex blend) was tested using a tribometer to produce and continuous Stribeck curve that enables evaluation of the lubricant in the entire lubricity regime. The results of the CoF using EP Lubricity Meter were transformed calculating the Stribeck number to build the curve. The reduction of the CoF in the boundary lubrication region occurs when the asperities of the wellbore and the bit/BHA are in contact. This is explained by the adsorption of the novel solid-state lubricant onto the asperities providing a smooth surface. The novel solid-state lubricant has a wide particle distribution (PSD) to cover different size and height of asperities. The Stribeck curves of the novel solid-state lubricant show that the lubricant can reduce CoF in the boundary lubrication region where friction forces are highest as compared with a base fluid and other liquid lubricants. EP Lubricity Meter: The more common lubricity test measures fluid resistance of various lubricating additives. The standard lubricity coefficient test is run at 60 rpm with 150 in-lb of force (the equivalent of approximately 600 psi (4,137 kPa) pressure of the intermediate fluid) and is applied to two hardened steel surfaces, a rotating ring, and a stationary block. Friction is measured as the CoF (µ). The CoF between two solids is defined as the frictional force of the load or the force perpendicular to the surfaces. The CoF is independent of the apparent areas of contact as long as this area is not so small as to break through the film. The force to overcome friction will be the same for a small area as for a larger area. The force, F, required to slide the block and the ring surfaces across each other at a given rate is measured by the power required to turn the test ring shaft at a prescribed rate of revolutions per minute. The Coefficient of Friction (CoF), µ=Meter Reading/Load or force.

Lubricity Evaluation Monitor: The Lubricity Evaluation Monitor (LEM) is a laboratory device designed to evaluate lubricants by direct comparison. It determines the CoF between an interchangeable wellbore sample (casing, formation, sandstone, etc.) pressed against a rotating steel bob while immersed in a circulating cup of test fluid. The LEM measures relative friction factors under ambient temperature and pressure. It is purpose-designed to provide lubricity comparisons between different fluid systems and/or fluid additives. The unit can utilize frictional materials such as sandstone or casing. A pneumatic ram applies side load, pushing the bob against the sample, periodically refreshing the test fluid by pulling the bob away from the sample at definable intervals. The clamp allows samples of casing, formation, sandstone, etc. to be tested in the same fixture. The LEM has computerized data acquisition and control software. The user inputs rotational speed, side load, and refresh parameters. Testing archives provide access to historical data graphs which include: rotational speed (RPM), torque (in-lb), side load (lb), and CoF with respect to time. The test is run, and the machine collects 600 data points or until CoF values have been stabilized.

Tribometer: When lubrication is applied to reduce the wear/friction of moving surfaces, the lubrication contact at the interface can shift from several regimes such as Boundary, Mixed, and Hydrodynamic Lubrication. The thickness of the fluid film plays a major role in this process, mainly determined by the fluid viscosity, the load applied at the interface, and the relative speed between the two surfaces. How the lubrication regimes react to friction is shown in what is called a Stribeck curve. The trobometer shows a method with the ability to measure a continuous Stribeck Curve. Using advanced step-less speed control, from 2000 to 0.01 rpm, within 10 minutes the software directly provides a complete Stribeck Curve. The simple initial setup only requires users to select the Exponential Ramp Mode and enter initial and final speeds, rather than having to perform multiple tests or program a stepwise procedure at different speeds requiring data stitching for the conventional Stribeck curve measurements. The Stribeck Curve plots the CoF as a function of viscosity, speed, and load. The vertical axis is the CoF and the horizontal axis is a parameter that combines the other variables. Measuring objective: The Stribeck curves were measured using two lubricant oils with different kinetic viscosities for comparison. A pin-on-disk tribometer equipped with the lubrication module was used. The rotational speed decreased at an exponential rate from 2000 to 0.01 rpm to showcase the continuous Stribeck Curve measurement and the precise sensitivity of the tribometer capabilities.

Figure 13:
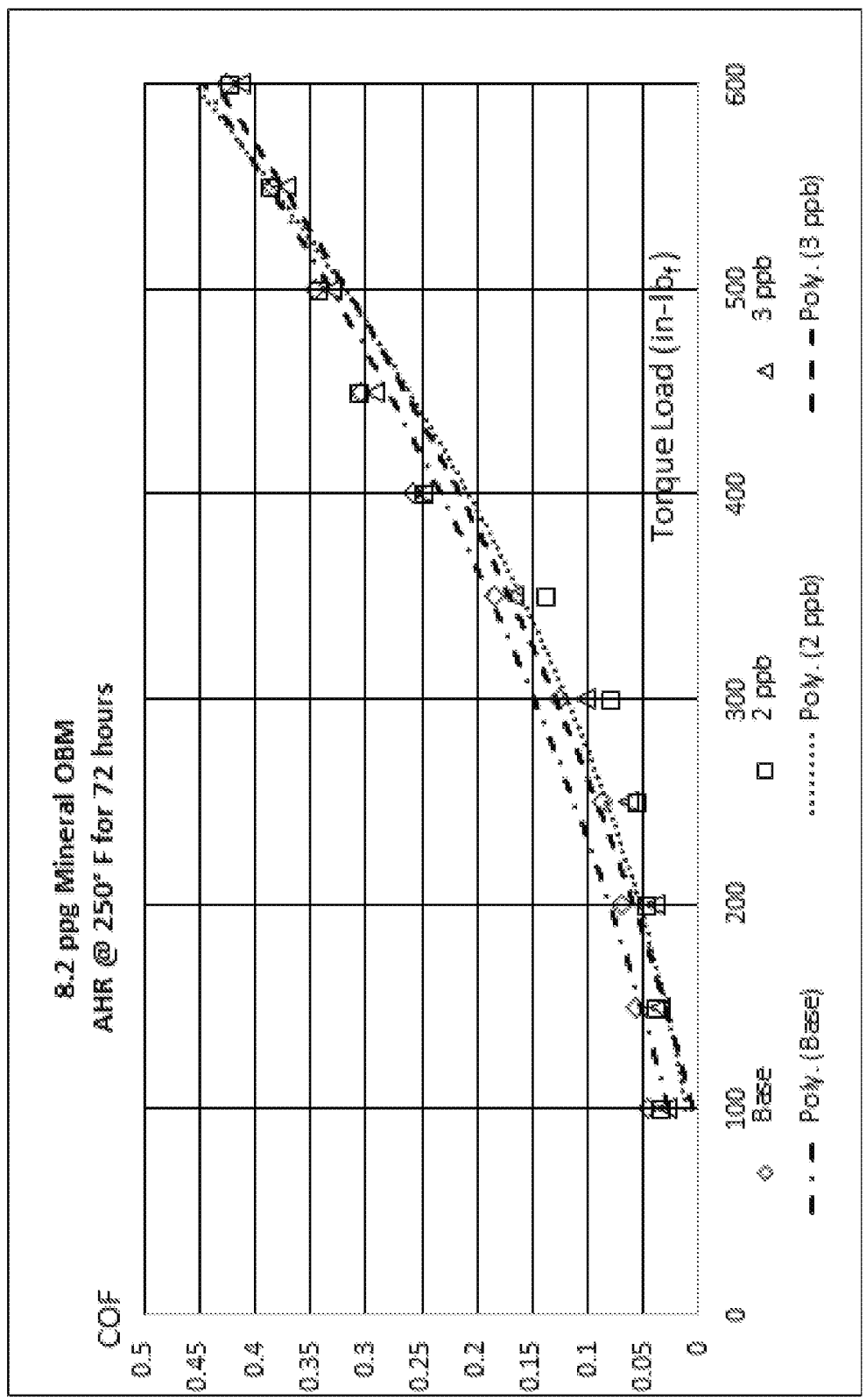
FIG. 13 is a chart illustrating variation in coefficient of friction with torque for oil-based drilling mud compositions including a solid lubricant.

The initial lubricity data was obtained using the standard EP lubricity meter. Usually the CoF is defined based on the torque load of 150 in-lb while rotating at 60 rpm. However, when the CoF versus torque load of the base fluid and the base fluid containing 2 and 3 lbm/bbl of solid-state lubricant (4:1 or 80/20 SAS-latex blend) is plotted, the shape of the adjusted curve exhibited a characteristic profile. As observed in FIG. 13, the solid-like lubricant (4:1 or 80/20 SAS-latex blend) presented lower CoF at lower torque loads. FIG. 13 is a chart illustrating variation in coefficient of friction with torque for oil-based drilling mud compositions including a solid lubricant.

Example 15

Figure 14:
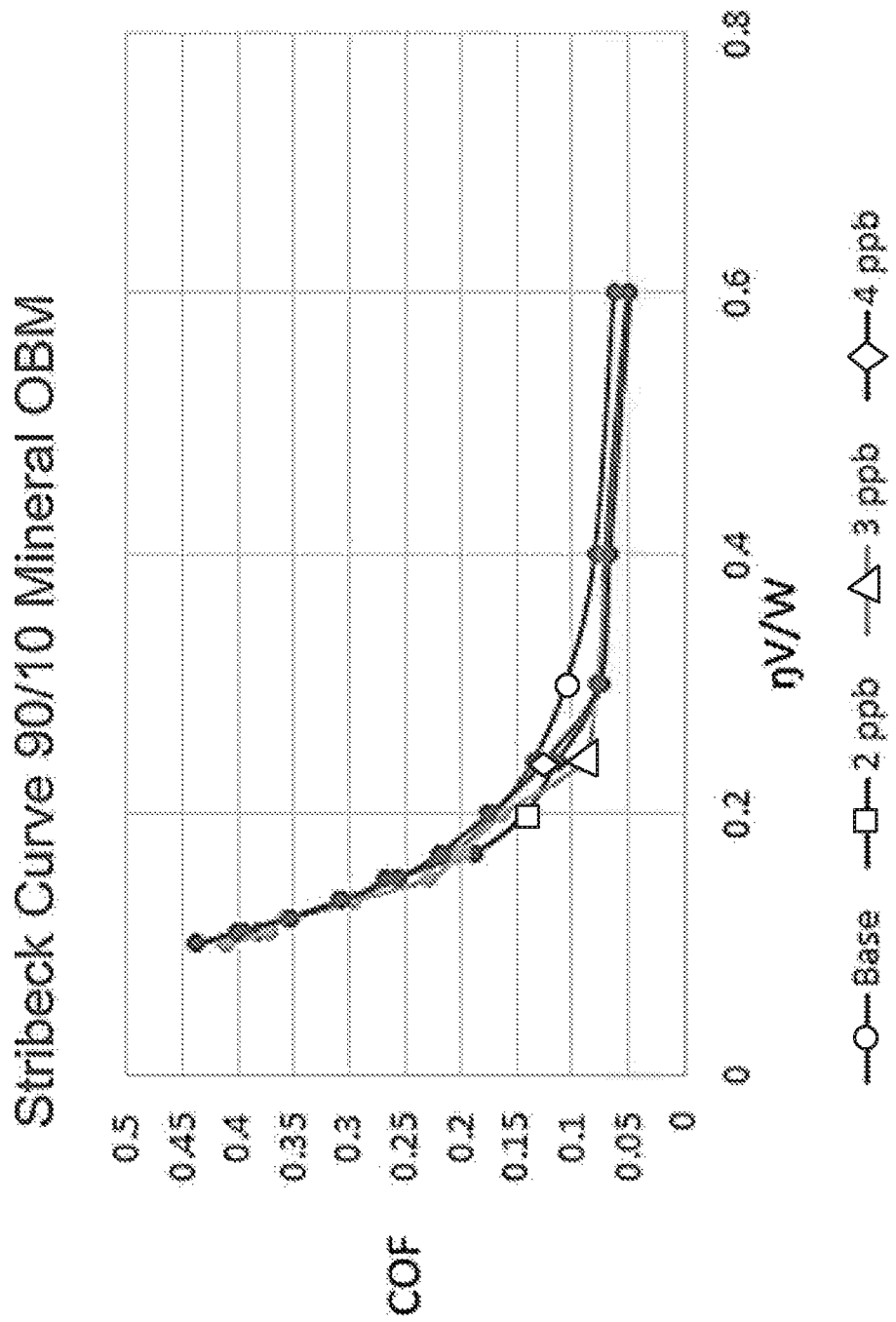
FIG. 14 is a chart illustrating variation in coefficient of friction with Stribeck number for oil-based drilling mud compositions excluding and including a solid lubricant.

The results of the EP Lubricity Meter were then plotted to build the Stribeck curve. The x-axis is the Stribeck number=η*V/W, calculated using the rpm (60) and the torque load and assuming dynamic viscosity of 1, with the purpose of observing the profile of the curve in a different approach. The results appear in FIG. 14, showing the behavior of the solid-like lubricant (4:1 or 80/20 SAS-latex blend) at 2 lbm/bbl, 3 lbm/bbl, and 4 lbm/bbl in the boundary lubrication regime at lower Stribeck numbers. The lubricant reduces the CoF in the boundary condition compared with the base fluid. FIG. 14 is a chart illustrating variation in coefficient of friction with Stribeck number for oil-based drilling mud compositions excluding and including a solid lubricant. The base drilling mud composition included 8.2 lbm/bbl 90/10 OWR (oil-water ratio) with Gibson D822 oil (Gibson Energy, Houston, Tex.).

Figure 15:
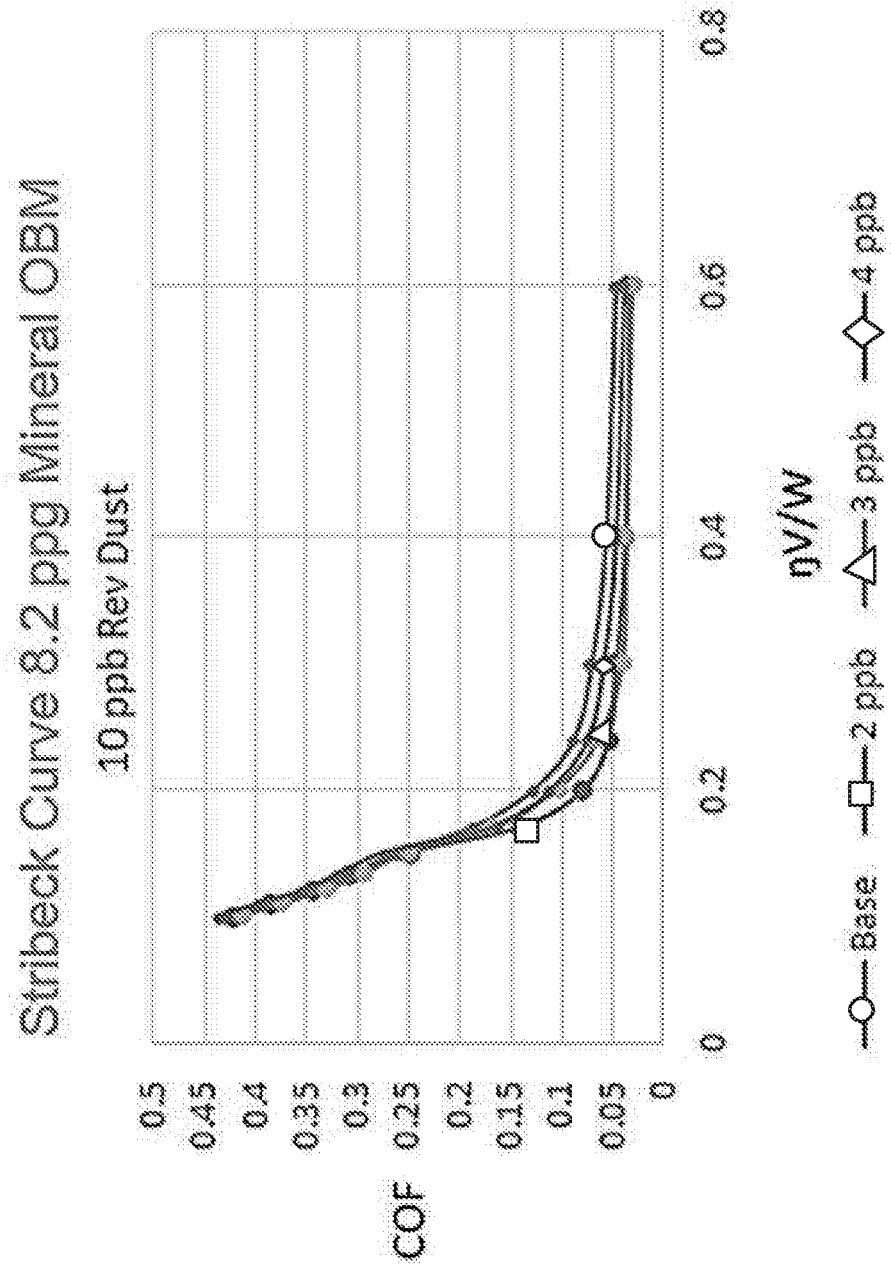
FIG. 15 is a chart illustrating variation in coefficient of friction with Stribeck number for oil-based drilling mud compositions excluding and including a solid lubricant and a particulate friction reducing material.

The same method was used to calculate the Stribeck curve of the same fluid containing 10 lbm/bbl of Rev Dust™ Inert Particulate (Milwhite, Inc., Houston, Tex.). The effect on the CoF of the sample with 2.0 lbm/bbl of lubricant is clear in the presence of the simulated low gravity solids in the boundary condition. FIG. 15 is a chart illustrating variation in coefficient of friction with Stribeck number for oil-based drilling mud compositions excluding and including a solid lubricant and the particulate friction reducing material. The base drilling mud composition included 8.2 lbm/bbl 90/10 OWR with Gibson D822 oil (Gibson Energy, Houston, Tex.).

Figure 16:
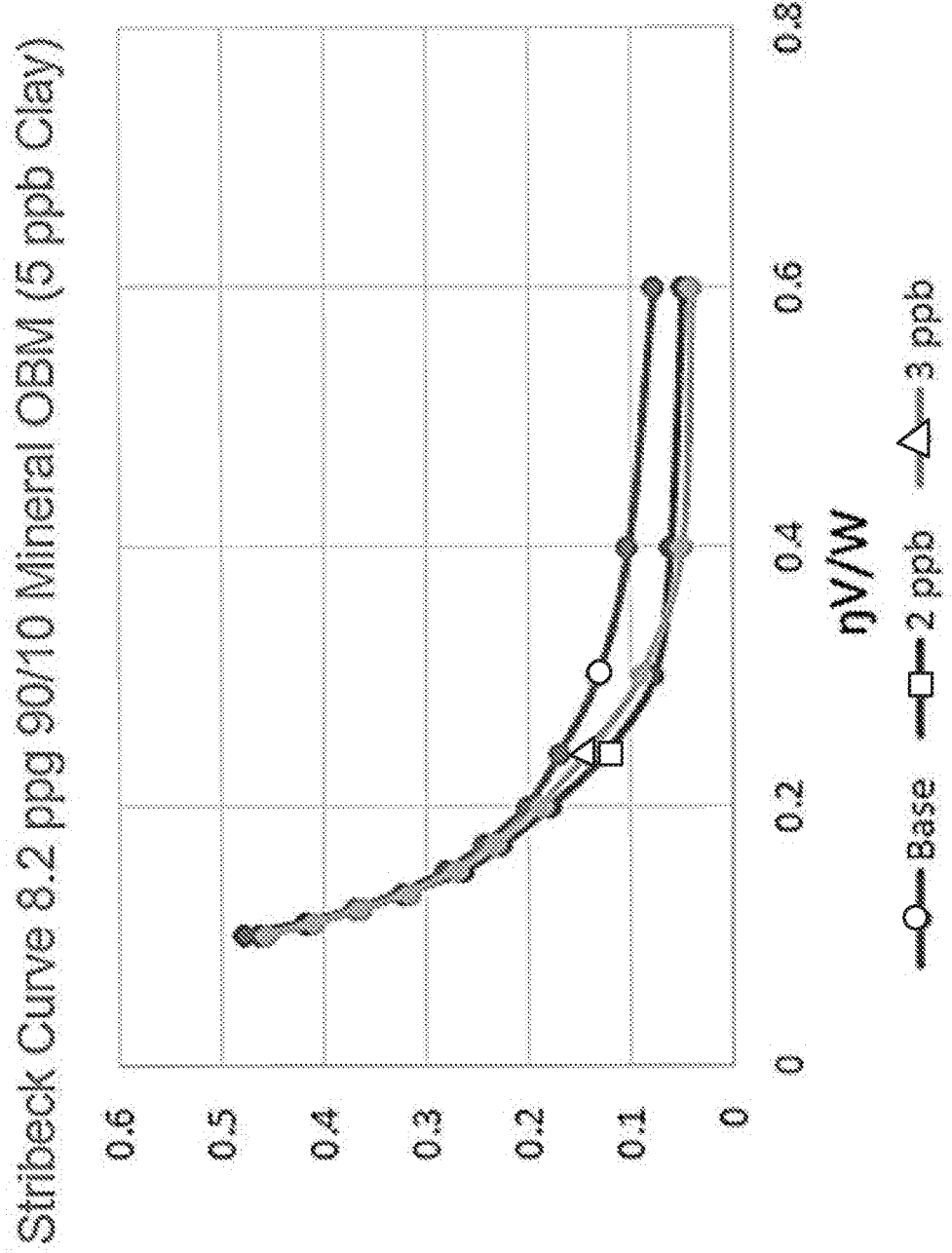
FIG. 16 is a chart illustrating variation in coefficient of friction with Stribeck number for oil-based drilling mud compositions excluding and including a solid lubricant and an organophilic clay.

Another base fluid was used to test the lubricant and the results appear in FIG. 16. The effect of the lubricant on the boundary lubrication condition using 90/10 OWR Mineral OBM (oil-based mud) with 5.0 lbm/bbl of organophilic clay was noted. The base drilling mud composition included 8.2 lbm/bbl 90/10 OWR with PureDrill™ HT 40 oil (Petro-Canada, Mississauga, Canada). FIG. 16 is a chart illustrating variation in coefficient of friction with Stribeck number for oil-based drilling mud compositions excluding and including a solid lubricant and an organophilic clay.

Example 16

An examination of the CoF was made with a Dynamic Lubricity Meter. Contrary to the EP Lubricity Meter, where the CoF was measured using the same film while increasing the torque load, the LEM contact between the rotor and the block is refreshed continuously as the fluid circulates. The tests were conducted using several stages until a stable dynamic CoF was obtained.

A lab sample of 85/15 OWR and 11.0 lbm/gallon Diesel OBM and a sample of base fluid with 2.0 lbm/bbl of solid-state lubricant were tested in the LEM. Although the measured CoF of both samples were 0.12, an assessment of the data showed that the fluid containing no solid-like lubricant presented a higher CoF static compared with the fluid containing the solid-state lubricant. The CoF static is the maximum peak observed in the initial part of each stage while the rotor starts moving in the boundary condition.

Example 17

The Stribeck curves of fluids containing the solid-state lubricant (4:1 or 80/20 SAS-latex blend) as compared to liquid lubricants and their performance under boundary conditions were evaluated. The tribometer has the ability of producing a continuous Stribeck curve while varying the rpm between 0.01 and 1000 rpm. Instrument rotation speeds between 0.01 and 250 rpm were used for practical purposes. A fixed load of 150 in-lb was also selected while measuring the CoF values.

The same fluid tested in the LEM was used to build the Stribeck curves using the tribometer. Four tests were run including the base fluid (BF) and samples of base fluid containing 2.0 lbm/bbl of solid-state lubricant and 2% by volume of two liquid lubricants. The results are displayed in the FIGS. 17, 18, and 19.

Figure 17:
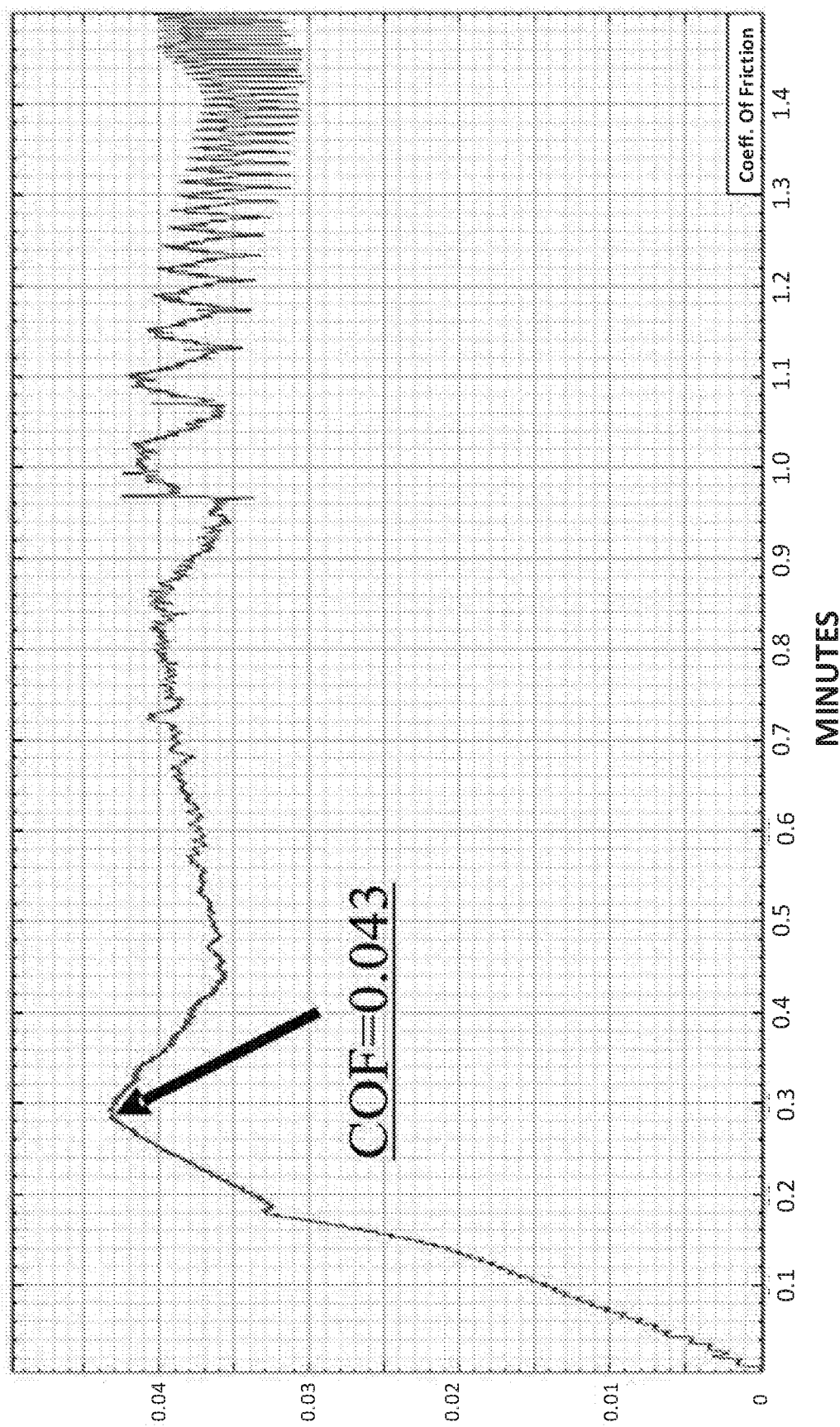
FIG. 17 is a chart illustrating coefficient of friction with time for a base oil-based drilling mud composition.
Figure 18:
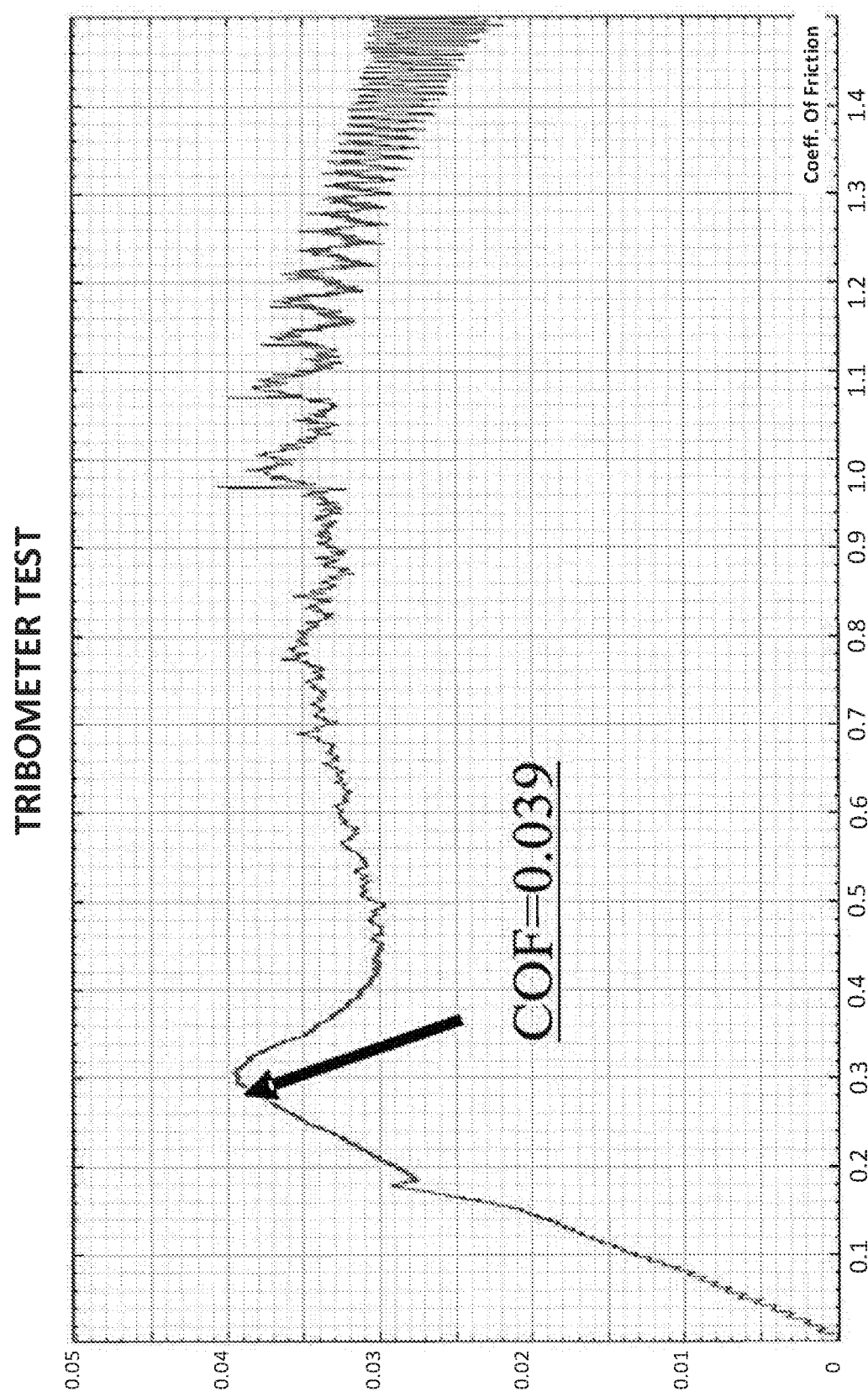
FIG. 18 is a chart illustrating coefficient of friction with time for a base oil-based drilling mud composition including a solid lubricant.
Figure 19:
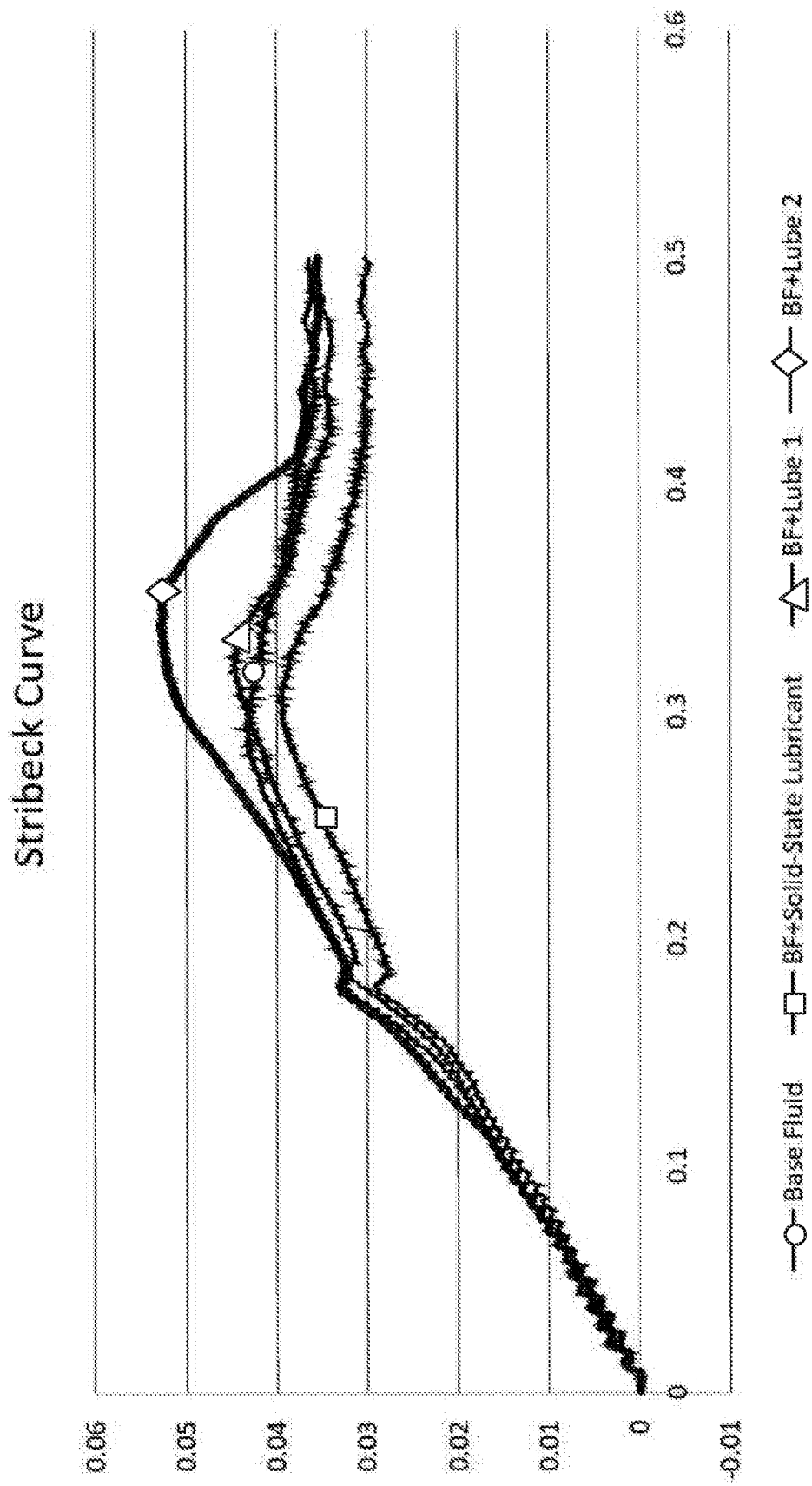
FIG. 19 is a chart illustrating variation of coefficient of friction with Stribeck number for oil-based drilling mud compositions excluding lubricant, including a solid lubricant, and including two different liquid lubricants.

FIG. 17 is a chart illustrating coefficient of friction with time for a base oil-based drilling mud composition. FIG. 18 is a chart illustrating coefficient of friction with time for a base oil-based drilling mud composition including the solid lubricant. FIG. 19 is a chart illustrating variation of coefficient of friction with Stribeck number for oil-based drilling mud compositions excluding lubricant, including a solid lubricant, and including two different liquid lubricants.

Lubricant 2 (Torque-Buster, Franklin Well Services, Vincennes, Ind.) showed a poor performance and caused adverse effect on the CoF of the base fluid. Lubricant 1 (Turbo-Lube, Farm-Oyl®, St. Paul, Minn.) presented better performance compared with Lubricant 2, providing a slight decrease of the CoF static and a similar CoF dynamic. The solid-state lubricant produced both a reduction of static and dynamic CoF in the entire range of rpm.

The dynamic CoF of the base fluid with 2.0 lbm/bbl of solid lubricant decreases continuously after 1.2 minutes. Conversely, of the tested liquid lubricants, one of the liquid lubes produced no improvement on the CoF, static or dynamic, and the other one produced an adverse effect on the CoF, both static and dynamic Without being bound by theory, the solid lubricant works in the boundary lubrication regime by producing a tribofilm, which reduces the viscosity.

Example 18

A field trial using the novel solid lubricant was conducted in the Permian Basin using a direct emulsion water-based mud. The purpose of the field trial was to evaluate the potential replacement of the OBM by the direct emulsion mud and the solid-state lubricant (4:1 or 80/20 SAS-latex blend). The solid-state lubricant was added by pill application at a concentration of 3.0 lbm/bbl until reaching the final concentration of 3.0 lbm/bbl in the circulating system. The operator increased the concentration up to 6.0 lbm/bbl by interval total depth.

A snapshot of the field trial conducted in the Permian Basin was assessed. An overall increase of the rate of penetration (ROP) with 6.0 lbm/bbl compared with 3.0 lbm/bbl of solid-state lubricant and sustaining a similar torque load was noted.

Figure 20:
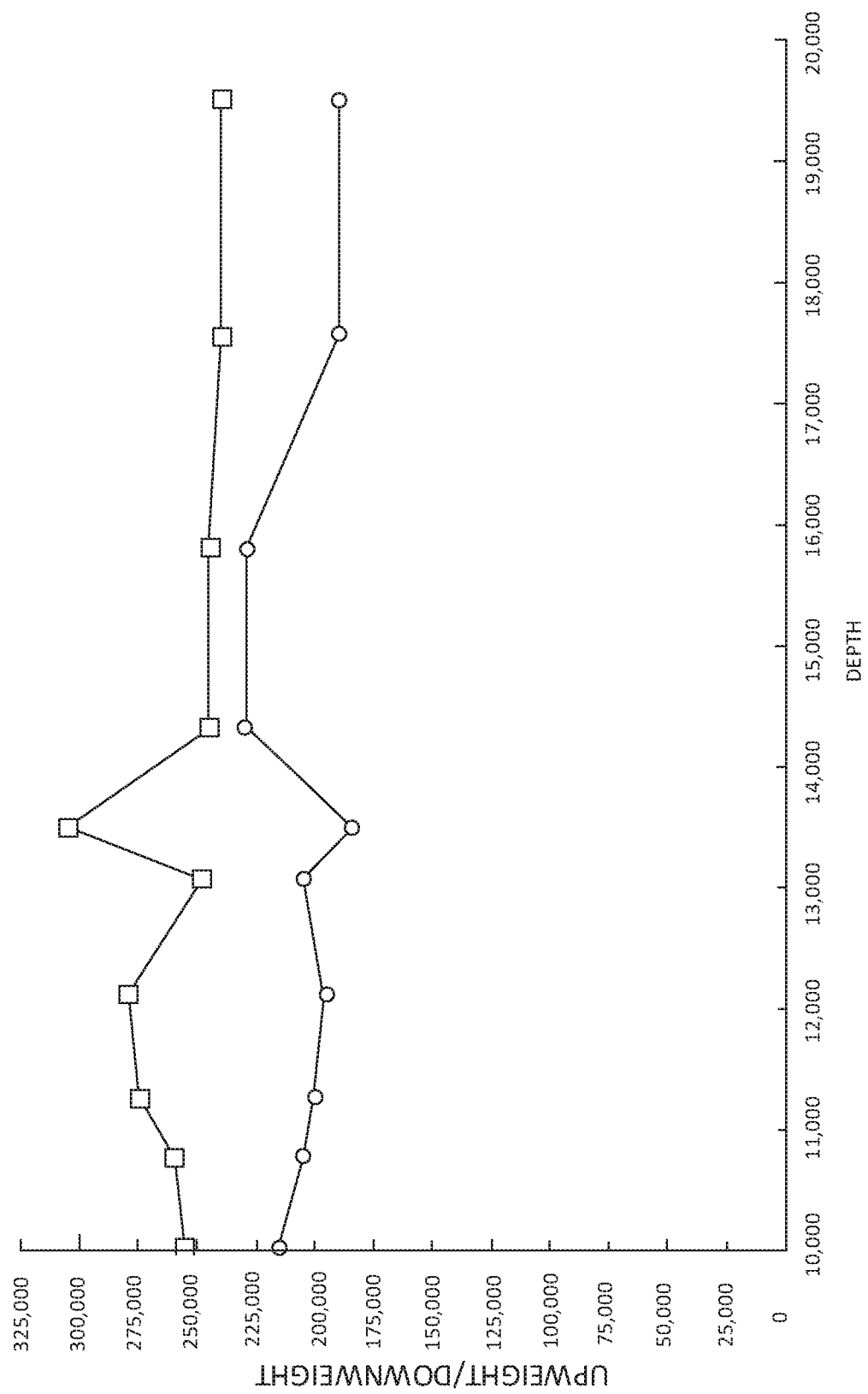
FIG. 20 is a chart illustrating variation of upweight and downweight along a horizontal section with depth.

The upweight and downweight was recorded along the horizontal section. FIG. 20 is a chart illustrating variation of upweight and downweight along a horizontal section with depth. While an increase of both upweight and downweight as depth increases is expected, both curves show a decrease of both measurements. The trend of the two curves are smooth when the concentration of the solid lubricant reached 3.0 lbm/bbl in the whole system.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "comprising" certain components or steps, but alternatively, can "consist essentially of" or "consist of" those components or steps unless specifically stated otherwise.

We claim:
1. A drilling mud composition, comprising a solid-state lubricant, wherein the solid-state lubricant comprises:

a first concentration of powdered latex; and a second concentration of sodium asphalt sulfonate (SAS), wherein the second concentration of SAS (by mass) is greater than or equal to the first concentration of latex (by mass), wherein the drilling mud composition comprises an oil-based carrier, wherein the first concentration of powdered latex is at least about 1 pounds per barrel (lbm/bbl) with respect to the drilling mud composition, wherein the powdered latex comprises at least one of a styrene butadiene copolymer or a vinyl acetate ethylene copolymer, and wherein the drilling mud composition has an average permeability plugging test (PPT) fluid loss at 300° F. with a 55 micrometer filtration disc of less than or about 1.06 mL when tested according to American Petroleum Institute (API) test 13B-2.

2. The drilling mud composition of claim 1, wherein the second concentration of SAS is greater than the first concentration of latex.

3. The drilling mud composition of claim 1, wherein the powdered latex has a population-averaged particle size in a range from about 70 micrometers to about 100 micrometers.

4. The drilling mud composition of claim 3, wherein the population-averaged particle size is in a range from about 80 micrometers to about 90 micrometers.

5. The drilling mud composition of claim 4, wherein the population-averaged particle size is about 85 micrometers.

6. The drilling mud composition of claim 1, wherein the drilling mud composition has a plastic viscosity at 120° F. in a range of from about 20 cP to about 30 cP when tested according to API test 13B-2.

7. The drilling mud composition of claim 1, wherein the drilling mud composition has a yield point at 120° F. in a range of from about 5 lb/100 ft$^2$ to about 6 lb/100 ft$^2$ when tested according to API test 13B-2.

8. The drilling mud composition of claim 1, wherein the drilling mud composition has a 10-second gel strength at 120° F. in a range between about 2 to about 11 lb/100 ft$^2$ when tested according to API test 13B-2.

9. The drilling mud composition of claim 1, wherein the drilling mud composition has a 10-minute gel strength at 120° F. in a range between about 10 to about 40 lb/100 ft$^2$ when tested according to API test 13B-2.

10. The drilling mud composition of claim 1, wherein the first concentration of powdered latex is about 1 lbm/bbl, and wherein the second concentration of SAS is about 3 lbm/bbl.

11. The drilling mud composition of claim 1, wherein the first concentration of powdered latex is in a range from about 1.5 to about 2.5 lbm/bbl, and wherein the second concentration of SAS is in a range from about 1.5 to about 2.5 lbm/bbl.

12. The drilling mud composition of claim 1, wherein the first concentration of powdered latex is about 2 lbm/bbl, and wherein the second concentration of SAS is about 2 lbm/bbl.

13. A method comprising dispersing a first predetermined amount of powdered latex and a second predetermined amount of SAS in an oil-based carrier to form an oil-based mud comprising the composition of claim 1.

\* \* \* \* \*